United States Patent
Chai et al.

(10) Patent No.: US 7,617,152 B2
(45) Date of Patent: Nov. 10, 2009

(54) BANKCARD TRANSACTION EXCHANGE SYSTEM

(75) Inventors: Hongfeng Chai, Shanghai (CN); Huaiguang Shan, Shanghai (CN); Yuemin Qi, Shanghai (CN); Rui Guo, Shanghai (CN); Wenbin Hu, Shanghai (CN); Jintan Wu, Shanghai (CN); Baohua Li, Shanghai (CN)

(73) Assignee: China Unionpay Co., Ltd., Shanghai (CN)

( * ) Notice: Subject to any disclaimer, the term of this patent is extended or adjusted under 35 U.S.C. 154(b) by 136 days.

(21) Appl. No.: 11/661,717

(22) PCT Filed: Aug. 29, 2005

(86) PCT No.: PCT/CN2005/001337

§ 371 (c)(1),
(2), (4) Date: Feb. 28, 2007

(87) PCT Pub. No.: WO2006/024223

PCT Pub. Date: Mar. 9, 2006

(65) Prior Publication Data

US 2008/0098393 A1   Apr. 24, 2008

(30) Foreign Application Priority Data

Aug. 31, 2004 (CN) .................... 2004 1 0054170

(51) Int. Cl.
*G06Q 40/00* (2006.01)
(52) U.S. Cl. ........................................ 705/39
(58) Field of Classification Search .............. 705/39
See application file for complete search history.

(56) References Cited

U.S. PATENT DOCUMENTS

| 6,629,081 B1 * | 9/2003 | Cornelius et al. .............. 705/30 |
| 6,654,747 B1 | 11/2003 | Van Huben et al. |
| 6,731,729 B2 * | 5/2004 | Eng et al. .............. 379/121.03 |
| 6,954,733 B1 * | 10/2005 | Ellis et al. ...................... 705/26 |
| 7,069,234 B1 * | 6/2006 | Cornelius et al. .............. 705/26 |
| 7,167,844 B1 * | 1/2007 | Leong et al. .................. 705/80 |

(Continued)

FOREIGN PATENT DOCUMENTS

CN   1288205   3/2001

(Continued)

*Primary Examiner*—Kambiz Abdi
*Assistant Examiner*—Lindsay M. Maguire
(74) *Attorney, Agent, or Firm*—Cooper & Dunham, LLP

(57) ABSTRACT

A novel bankcard transaction exchange system, which is also an exchange network and a settlement network of various bankcard transactions at the same time, comprising: a processing center, at least one backup center, and a plurality of member institutions connected to the processing center via a network, characterized in that: the processing center is configured with a switching subsystem and a batch processing subsystem, and it can achieve interoperability effectively. The system of the invention is a bankcard transaction processing platform which can realize "centralized exchange and unified settlement", wherein advanced switching technologies are employed, various network access interfaces may be compatible; transaction exchange and settlement of various currencies and various cards are supported; parameterized function configuration is supported; it may be adapted to the changes of the market, and easy for function expansion; it is convenient for users; it is secure and reliable; and the peak transaction capacity can meet the requirements of the development of future bankcard service.

24 Claims, 17 Drawing Sheets

U.S. PATENT DOCUMENTS

| | | | |
|---|---|---|---|
| 7,426,493 B2 * | 9/2008 | Takeshima et al. | 705/41 |
| 7,445,150 B2 * | 11/2008 | Aigbogun | 235/381 |
| 2002/0138353 A1 * | 9/2002 | Schreiber et al. | 705/26 |
| 2002/0194120 A1 | 12/2002 | Russell et al. | |

FOREIGN PATENT DOCUMENTS

| | | |
|---|---|---|
| EP | 1296259 A1 | 3/2003 |
| JP | 2000-285314 | 10/2000 |
| TW | 594535 | 6/2004 |

* cited by examiner

# BANKCARD TRANSACTION EXCHANGE SYSTEM

FIELD OF THE INVENTION

The present invention relates to a bankcard transaction exchange and settlement platform, in particular, to a high-efficiency exchange platform which achieves interoperability.

BACKGROUND OF THE INVENTION

Since the bankcard industry of China starts relatively late, and corresponding specialized service companies are lacking, various commercial banks construct their own bankcard transaction exchange networks and settlement networks everywhere, and have their own styles. Based on such a historical background, a national bankcard exchange general center is established on the basis of scattered regional exchange networks, so that a nationwide unified exchange network is formed. Such a network can preliminarily realize the nationwide networked transaction, as shown in FIG. 1, wherein the national general center is connected with each regional center respectively, such as regional center a, regional center b, regional center c and so on, while each regional center is connected with each bank in the region, such as bank A, bank E, so that remote cross-bank transaction may be realized through the national general center. However, due to the existence of the regional centers, the exchange mechanism realized in this system is actually a "two-stage exchange" mechanism, wherein when an acquiring institution and a card-issuing institution are in the same region, transaction exchange is accomplished in a regional center; otherwise, the transaction should go through three exchange nodes, the regional center a, the national general center and the regional center b, so that the number of exchange nodes concerned is large, and disadvantages such as slow transaction response and low success ratio, etc. will appear.

In general, the bankcard exchange system used currently is somewhat blind in the planning layer, has such disadvantages as unitary function, small covering area and low efficiency, and can not achieve scale merit; the network structure is unreasonable and has too many layers, which results in slow transaction response speed and low success ratio; the investment is overlapped and unending, and investors are burdened with heavy capital pressure; on the technical layer, the host platforms are disunified and developed in each region alone and the application versions are disunified, so it is difficult to interconnect them; on the layer of new service development, since the hardware platforms are different and the software versions are disunified, it is difficult to update and upgrade the software when new channels and services are developed; in addition, the market changes rapidly and it is required to response quickly, so the service pressure is great and it can not meet the requirements of service development.

At the same time, new requirements are laid on the bankcard transaction exchange system with the development of society and financial service in China, Specifically, the commercial bank system develops towards centralized mode, and it has been a tendency in the finance industry to establish a centralized national financial processing center, so the advantages, which each regional exchange system originally has, become to disappear; the bankcard transaction volume increases rapidly, which lays higher requirements on the processing ability of the existing exchange system, and since 2002, the cross-bank transaction volume of bankcards increases by more than 10% monthly; it has been more and more intense to develop new services, and in order to avoid the blindness in the development in each region and to facilitate, not to hinder, the rapid development of the service, new plans must be made technically and new methods must be employed to accommodate the requirements of the market; the implementation of a novel centralized transaction exchange system will increase the management efficacy and reduce the cost effectively; at the same time, technical updates in the exchange system are favorable for the financial institutions of China to improve their overall competitive power and to participate in the global competition.

Therefore, in the next development stage of the bankcard industry of China, interoperability must be further achieved, the success ratio and the speed of the exchange must be increased, the operating efficiency of the exchange system and the settlement system must be improved, the update and upgrade cost of the system must be lowered, and the security of financial information must be ensured in the global development tendency of bankcards. In addition, the specifications must be unified with each international credit card organization, and more protocols, terminals and member institutions must be supported. As a result, a novel bankcard transaction exchange system suitable for the current stage must be provided.

SUMMARY OF THE INVENTION

It is an object of the present invention to provide a novel bankcard transaction exchange system, which not only can meet the requirements of transaction exchange, and clearing and settlement in commerce and finance, but also has the following characteristics: 1) it can meet the requirements of continuous development of new services and reduce system cost to the maximum extent; 2) it can realize high-efficiency processing in the transaction exchange and settlement of domestic bankcard; 3) it can realize the networking with international credit card organizations (companies). As a result, a bankcard transaction exchange and settlement center with a large covering area, full service types, strong processing capacity and system stability may be formed.

More specifically, the system of the invention is a bankcard transaction processing center which can realize "centralized exchange and unified settlement", wherein advanced switching technologies are employed, the current various network access interfaces are compatible, and various network protocols are supported; intra-bank transaction and cross-bank transaction are both supported, and domestic bankcard transaction and cross-nation bankcard transaction are both supported; transaction and settlement of various currencies such as local currency card, international card and foreign card, and of various cards such as debit card, credit card and semi-credit card are supported; parameterized function configuration is supported; and it may be adapted to the changes of the market, and easy for function expansion; the settlement methods can meet the requirements of various member institutions; it is convenient for users; it is secure and reliable; and the peak transaction capacity can meet the requirements of the development of future bankcard service.

The invention relates to a novel bankcard transaction exchange system, which is an exchange network and a settlement network for various bankcards at the same time, comprising: a processing center, at least one backup center, and a plurality of member institutions connected to the processing center via a network, wherein each member institution may also be connected to one or more backup centers thereof; the processing center comprises at least a switching subsystem and a batch processing subsystem, and it may achieve interoperability effectively.

The member institutions may include various banks, specialized service institutions, and various front-end processors, such as ATM (Automatic Teller Machine) front-end processor, POS front-end processor, payment gateway front-end processor, mobile payment front-end processor and public payment platform front-end processor. The above front-end processors refer to servers disposed in each main place for controlling and managing various transaction terminals in its coverage area. The front-end processors will deliver the received transaction requests directly to the processing center of the system, and send the processing result fed back by the processing center to the corresponding transaction terminal.

The above bank may act as a card-issuing bank or an acquiring bank in the system. When a bankcard or a common bank account is acquired in a bank which issues the same, the bank acts a card-issuing bank and an acquiring bank at the same time; similarly, a specialized service institution may be a specialized card-issuing company or a specialized acquiring institution, or it may be a specialized service institution with the functions of both a card-issuing company and an acquiring institution.

The above novel bankcard transaction exchange system at least comprises: a switching subsystem and a batch processing subsystem. Wherein, the switching subsystem is responsible for connecting each member institution, receiving and forwarding a transaction request and a response, and providing a routing service and recording logs. The batch processing subsystem is responsible for clearing and settling a transaction in a way agreed on with the member institution, and it supports self-determination settlement mode and unself-determination settlement mode, and supports single message and dual message settlement ways; and it is responsible for processing settlement of various transaction capitals and various service charges. The above settlements may include: settlements of capital and service charge of a transaction such as POS consumption, ATM cash withdrawal and so on; and profit allocation of service charge among the institutions participating in the transaction.

The novel bankcard transaction exchange system further comprises an exception transaction processing service package, which is responsible for processing wrong accounts or suspicious accounts generated during a transaction, and its main functions include original transaction matching, exception transaction file processing, transaction period control and exception transaction settlement file generation, etc. It is used so that not only the efficiency of the system exchange network will not be affected, but also exception transactions will be settled in time. It supports three exception transaction request initiating modes: online transaction, file transferring and Web.

The novel bankcard transaction exchange system of the invention is further configured with a security subsystem, which provides security control measures at various layers of the system and ensures that the system operates safely. Its main functions include user right control, user validity verification, key management, algorithm deposit, message encryption and decryption, password check, file encryption and decryption control and log recording, etc.

The novel bankcard transaction exchange system of the invention is further configured with a management service package, which is responsible for the unified management on member institution information and system parameters, and for the online management on the transferring and processing of a transaction. And its main functions include: adding, deleting, modifying, querying and activating of institution information and system parameters; online sign-in and sign-out; key reset; system monitoring, etc.

The management service package makes the system sufficiently adapted to the requirements on service change by setting and modifying the parameters, that is, all or some of operating rules of the system may be adjusted or modified without modifying other parts of the system and without shutting down the system.

The novel bankcard transaction exchange system of the invention is further configured with a risk information sharing service package, which is responsible for collecting, processing and distributing various risk information, and preventing a forbidden transaction from occurring, lowering transaction risk, and internally sharing a list of payment forbidding, transaction rejection, forbidden cardholders, forbidden card-holding enterprises and forbidden merchants, etc. and the related detail records for the member institutions and the system.

The novel bankcard transaction exchange system of the invention is further configured with a file transferring subsystem, which is responsible for the file transferring between member institutions and is a main interface for file exchange between the system and the member institutions. Its main functions include external file transferring function, information exchange function with internal subsystems and file cleaning function. It is used for ensuring the smoothness of online transaction communication channel, and increasing the overall operating efficiency of the system.

The novel bankcard transaction exchange system of the invention is further configured with a query and report service package, which is responsible for providing information query to internal and external institutions, and making, analyzing and obtaining a report. Its main functions include data collecting, online query, report making, report generating and report providing, etc. It may also provide a report customization function, which not only is convenient, but also can improve the system efficiency.

The novel bankcard transaction exchange system of the invention is further configured with a stand-in authorization subsystem, which is responsible for accomplishing stand-in authorization of a transaction according to the agreement with each bank as a member institution. Its functions specifically include quota control, accumulated amount control and accumulated transaction number control, etc., together with log recording, charge calculation, transaction check (such as security check and account validity check) etc.

The above stand-in authorization includes normal stand-in authorization and abnormal stand-in authorization. Normal stand-in authorization means that the processing center authorizes a transaction on behalf of the card-issuing party when the card-issuing party is normal; abnormal stand-in authorization means that the processing center authorizes a transaction on behalf of the card-issuing party when the card-issuing party is abnormal.

In the novel bankcard transaction exchange system of the invention, the management service package, the risk information sharing service package, the exception transaction processing service package and the query and report service package may also be centralizedly configured as a backline subsystem. At the same time, the backline subsystem is further configured with a dedicated backline portal, which provides a unified and easy-to-use operating interface with the uniform style to various operators of the system, so that the system is more convenient to operate.

Each subsystem of the novel bankcard transaction exchange system of the invention is configured with an error-reporting information processing module, which is responsible for processing all the error information in the subsystem. By processing all the error information in the subsystem unifiedly via the module, it is favorable to increase the processing speed of the subsystem itself and the throughput of the system.

The architecture of the bankcard transaction exchange system of the invention is divided into a communication access layer, an application processing layer and a data storing layer, and its database is adapted to the requirements of high-efficiency operation and meets the requirements of disaster-recovery backup.

The communication access layer is responsible for the access of message transferring, file transferring and the access security control, and the communication access layer comprises a communication server, a file transferring server, a firewall and a domain name server, wherein: the communication server is responsible for the communication access of a online transaction of a member institution; the file transferring server is responsible for the transferring and processing of files; the firewall is responsible for access security control; and the domain name server is responsible for providing domain name resolution service.

The application processing layer is responsible for processing an application, and it comprises at least one or more switching application servers, stand-in authorization application servers, security application servers, user management application servers and backline application servers.

The switching application server comprises a switching application server responsible for local card transaction and a switching application server responsible for foreign card transaction.

The switching application server responsible for foreign card transaction and the stand-in authorization application server are mutual hot backup devices.

The stand-in authorization application server is responsible for processing a stand-in authorization transaction. The server and the foreign card switching application server are mutual hot backup devices.

The security application server is responsible for providing a centralized security service to all the subsystems in the frontline part except the switching application server and the foreign card switching application server. Wherein, the system is configured with an encryption device which may be called directly by the switching application server and the foreign card switching application server. By directly calling the encryption device, the operating efficiency of the switching application server may be increased.

The frontline part means the part of a system except for the backline subsystem. The backline subsystem comprises a management service package, a risk information sharing service package, an exception transaction processing service package and a query and report service package.

The user management application server is responsible for the unified management on users of the whole application system, and employs a configuration with two servers to form primary-secondary mode.

The backline application server is responsible for processing the online services of the whole backline subsystem, wherein a J2EE (Java 2 Enterprise Edition) architecture is employed.

The data storing layer is responsible for managing all the data required to be stored and processed in the system, and it comprises a database server, a data storage file-sharing space server and a storing system. The database server and the storing system are connected via a high-speed network, so that the complexity of data backup and disaster-recovery backup may be lowered, and the linear expansion ability and centralized management of the storing system may be improved.

Data exchange between the data storing layer and the application processing layer is also accomplished via a high-speed network, so that high-performance data access on the data storing layer by the application processing layer may be ensured, and the pressure laid on the network by burst data flow may be alleviated.

The database server comprises a switching database server, a stand-in authorization database server, a backline data warehouse server, a batch processing application server and a NFS (Network Files Services) server.

Wherein, the switching database server is responsible for storing transaction logs related to the switching and the foreign card switching.

The stand-in authorization database server is responsible for storing data related to stand-in authorization.

The backline data warehouse server is responsible for storing transaction data, configuration parameter, management parameter, transaction historical data, and transaction analyzing and security data etc. of the whole application system. Three databases are established on this server, i.e., a security and management database, a backline database and a historical database respectively. Wherein, the security and management database is mainly used for storing system online transaction security data and application system configuration data; the backline database is mainly used for storing a copy of batch processing log data, settlement detail data and institution information; and the historical database is mainly used for storing a copy of historical transaction data, intermediate statistical data and institution information.

The switching database server, the stand-in authorization database server and the security and management database server are mutual hot backup devices.

The batch processing application server is responsible for the batch processing of transactions, and the shared storing of files.

The batch processing application server and the backline data warehouse server are mutual hot backup devices.

The NFS server provides a common file service to each subsystem via standard Network Files Service (NFS).

The invention further relates to a bankcard transaction exchange method in a bankcard transaction exchange system, the bankcard transaction exchange system comprising a processing center, at least one backup center, and a plurality of member institutions connected to the processing center via a network, the processing center comprising at least a switching subsystem and a corresponding switching database, a batch processing subsystem, a historical database and a backline database, the bankcard transaction exchange method comprising: performing transaction switching through the switching subsystem; and performing transaction clearing and settlement through the batch processing subsystem.

The bankcard transaction exchange method further comprises a process for a finance-type transaction initiated in online mode by a member institution using the system according to the invention, a transaction flow of which comprises the following steps:

1) an acquiring party initiates a transaction request in online mode to the switching subsystem of the processing center, and the switching subsystem determines whether the transaction is allowed for stand-in authorization, if not, then the transaction flow proceeds to 2); otherwise, the transaction flow proceeds to 3);

2) the switching subsystem of the processing center forwards the transaction request to a card-issuing party, if the processing center can process a transaction normally with the card-issuing party, the switching subsystem sends the transaction request to the card-issuing party, and then the transaction flow proceeds to 5); otherwise, the switching subsystem determines whether the transaction is allowed for stand-in authorization, if yes, then the transaction flow proceeds to 3); otherwise, the transaction response will be "transaction failed" message, and the transaction flow proceeds to 6);

3) the switching subsystem of the processing center forwards the transaction to a stand-in authorization subsystem for processing, and the transaction flow proceeds to 4);

4) the stand-in authorization subsystem performs stand-in authorization and returns a response to the switching subsystem, then the transaction flow proceeds to 6);

5) the card-issuing party returns a transaction response to the switching subsystem of the processing center after it completes processing the transaction request;

6) the switching subsystem of the processing center forwards the transaction response to the acquiring party.

Correspondingly, the data flow corresponding to the above process is as follows:

1) the switching subsystem records a switching transaction log, if the transaction passes stand-in authorization, then the stand-in authorization subsystem records a transaction log;

2) the management service package starts a data transfer program at a fixed timing, and reads the switching log and the stand-in authorization log;

3) the data transfer program transfers the above logs to the historical database and the backline database, then records an intermediate statistical summary table;

4) the batch processing subsystem reads the transaction log from the backline database and performs multi-cycle clearing;

5) the batch processing subsystem records a settlement result in the backline database, and forms a clearing file and writes it into a file-sharing space; and 6) the batch processing subsystem backups the settlement result to the historical database from the backline database.

The bankcard transaction exchange method further comprises a process for a management-type transaction initiated in online mode by a member institution using the system according to the invention, a transaction flow of which comprises the following steps:

1) the member institution initiates a transaction request in online mode to the switching subsystem of the processing center;

2) the switching subsystem of the processing center forwards the transaction request to the backline subsystem management service package;

3) the management service package returns a transaction response to the switching subsystem; and 4) the switching subsystem of the processing center returns a transaction response to the member institution.

Correspondingly, the data flow corresponding to the above process is as follows:

1) the switching subsystem records an internal log;

2) the management service package records an internal log.

The bankcard transaction exchange method further comprises a process for an exception transaction processing transaction initiated in online mode by a member institution using the system according to the invention, a transaction flow of which comprises the following steps:

1) the member institution initiates a transaction request in online mode to the switching subsystem of the processing center;

2) the switching subsystem of the processing center forwards the transaction request to the management service package after receiving the transaction request;

3) the management service package returns a transaction response to the switching subsystem after receiving the transaction request; and 4) the switching subsystem of the processing center returns the transaction response to the member institution.

Correspondingly, the data flow corresponding to the above process is as follows:

1) the switching subsystem records a transaction log;

2) the switching subsystem sends a transaction request to the management service package;

3) the management service package writes the received information into the backline database;

4) the exception transaction processing service package reads the transaction request information from the backline database for processing, and records a log in the backline database;

5) the batch processing subsystem reads the transaction log and performs multi-cycle clearing; and 6) if the receiving institution is in single message mode, the batch processing subsystem records a settlement result to the backline database, and then the exception transaction processing service package sends the settlement result via messages in batches to a member institution; if the receiving institution is in dual message mode, the batch processing subsystem forms a clearing file and writes it into a file-sharing space, then the file transferring subsystem sends it to the member institution.

The bankcard transaction exchange method further comprises a process for an exception transaction processing transaction initiated by a network platform using the system according to the invention, a transaction flow of which comprises the following steps:

1) an operator of a member institution (sending party) logs in a backline portal and initiates an exception transaction processing transaction;

2) the portal forwards a transaction request to the exception transaction processing service package;

3) the exception transaction processing service package processes the transaction request according to service rules and records it in the backline database, then returns a response to the portal;

4) the portal returns the response to the operator of the member institution;

5) the batch processing subsystem processes the transaction request recorded in the backline database, and writes a processing result to the backline database;

6) the management service package reads the processing result of the above transaction request by the batch processing subsystem from the backline database, and sends it to the switching subsystem;

7) the switching subsystem forwards the exception transaction processing result to a receiving institution;

8) the same as 6);

9) the switching subsystem forwards the exception transaction processing result to the sending institution;

10) the receiving institution returns a response to the switching subsystem;

11) the switching subsystem forwards the response to the management service package;

12) the sending institution returns a response to the switching subsystem;

13) the same as 11).

In the above process, both the sending institution and the receiving institution require the system to return the exception transaction processing result to the respective institution in advance. If the receiving institution does not have the above requirement, then Steps 6, 7, 10 and 11 are not required; if the sending institution does not have the above requirement, then Steps 8, 9, 12 and 13 are not required.

Correspondingly, the data flow corresponding to the above process is as follows:

1) the exception transaction processing service package records a transaction log;

2) the batch processing subsystem reads the transaction log for multi-batch clearing;

3) the batch processing subsystem records a settlement result in the backline database, and forms a clearing file and writes it into a file-sharing space;

4) the management service package reads the settlement result, and forms a transaction message and sends it to the switching subsystem; and 5) the switching subsystem records an internal log.

The bankcard transaction exchange method further comprises a process for a management-type transaction initiated by a network platform using the system according to the invention, a transaction flow of which comprises the following steps:

1) an operator of the processing center logs in a service portal and initiates a management-type transaction;

2) the portal forwards a transaction request to the management service package;

3) the management service package forwards the transaction to the switching subsystem;

4) the switching subsystem forwards the transaction to a member institution;

5) the member institution returns a transaction response to the switching subsystem;

6) the switching subsystem forwards the transaction response to the management service package;

7) the management service package forwards the transaction response to the service portal; and 8) the portal returns the transaction response to the operator.

Correspondingly, the data flow corresponding to the above process is as follows:

1) the management service package records an internal transaction log;

2) the switching subsystem records an internal transaction log.

The bankcard transaction exchange method further comprises a process for a management operation initiated by a network platform using the system according to the invention, a transaction flow of which comprises the following steps:

1) an operator of the processing center logs in a service portal and initiates a management operation transaction;

2) the portal forwards an operation request to the management service package;

3) the management service package modifies configuration parameters of the security and management database, and "maps" it to the switching database via Relational Connect mechanism of database, then sends a data synchronization instruction to the switching subsystem;

4) the switching subsystem reads the configuration parameters modified in the switching database and refreshes its memory, then returns a response to the management service package;

5) the management service package forwards the response to the portal; and 6) the portal returns the response to the operator.

Correspondingly, the data flow corresponding to the above process is as follows:

1) the management service package modifies configuration parameters in the security and management database;

2) the database "maps" the data to the switching database using Relational Connect mechanism thereof;

3) the switching subsystem reads the configuration parameters and refreshes its memory.

The bankcard transaction exchange method further comprises a process for processing batch files using the system according to the invention, comprising the following steps:

1) an operator of a member institution logs in a portal and initiates a batch file upload transaction, or the member institution uploads batch files via the file transferring subsystem;

2) the processing center records file transferring information via the file transferring subsystem or the management service package (called by the portal) and then returns a response to the uploading party, after the processing center receives the files;

3) the file transferring subsystem writes the received files into a file-sharing space;

4) the batch processing subsystem reads data from the file-sharing space for processing;

5) the batch processing subsystem writes the processing result into the backline database;

6) the management service package reads the processing result information from the backline database;

7) the management service package informs the switching subsystem of sending the processing result to a receiving party;

8) the switching subsystem sends the processing result to the receiving party;

9) the receiving party returns a response to the switching subsystem; and 10) the switching subsystem forwards the response to the management service package.

Correspondingly, the data flow corresponding to the above process is as follows:

1) an operator of a member institution logs in a portal, or the member institution uploads batch files to a file-sharing space via the file transferring subsystem;

2) the processing center records the file transferring information in the backline database via the file transferring subsystem or the management service package (called by the portal) after receiving the files;

3) the batch processing subsystem reads the file information from the file-sharing space at determinated timing;

4) the batch processing subsystem records the file information in the backline database after processing;

5) the management service package reads the file processing result, and forms a transaction message and sends it to the switching subsystem; and 6) the switching subsystem records an internal log.

By implementing the present system, a high-efficiency, stable exchange network and settlement network may be provided for bankcard transaction exchange. Specifically, the novel system has the following characteristics: 1) High Performance, i.e., the rate of transaction switching processing is high, for example, the design index of the present system is that the average transaction processing rate should reach over 650 transactions per second on average, and over 3000 transactions per second at peak time, that is, over 24,000,000 transactions per day on average, and over 52,000,000 transactions per day at peak time, and under the test environment shown in Table 1, the actual processing capacity is not less than 10000 transactions per second; 2) High Reliability and High Availability, that is, the occurrence frequency of failure is low, and the fault-free ratio can reach 99.99%; 4) High Extensibility, that is, the system may be extended easily, for example, the transverse and longitudinal expansion capabilities both can reach above 0.8, wherein, transverse expansion means adding computers for processing, longitudinal expansion means improving the processing capability of the computer itself; 5) High Manageability, that is, it is easy for management, and high manageability may be realized via parameterized design of the system and the management measures on parameters. Therefore, the present system may be adapted to the requirements of the rapid growth of bankcard transactions in a rather long time period.

TABLE 1 partial configurations of the test environment

| PHYSICAL SERVER | LOGICAL PARTITION | NUMBER | CPU (LINES) | MEMORY | HARD DISK | GIGABIT OPTICAL FIBER NETWORK CARD |
|---|---|---|---|---|---|---|
| 1 X P690 | SWITCHING DATABASE SERVER | 1 | 32*1.7 G | 56 GB | 4*36.4 GB | MORE THAN 2 |
| 4 X P650 | SWITCHING APPLICATION SERVER | 4 | 8*1.45 G | 8 GB | 2*36.4 GB | 4 |
| 2 X P650 | COMMUNICATION SERVER | 2 | 8*1.45 G | 8 GB | 6*36.4 GB | 12 |

It should be pointed out that the system of the invention may also be used to process transactions which are initiated through non-bankcard, such as transactions initiated through a common bank account. The present system may accomplish the corresponding transaction request, so long as a transaction terminal delivers necessary transaction information, i.e., the bankcard information or the common bank account information, together with other transaction information such as transaction type, transaction amount and so on, to the system.

If the acquiring party and the card-issuing party acting as member institutions of the system according to the invention are the same bank, then the transactions processed by the system are intra-bank transactions; if the acquiring party and the card-issuing party are different banks or specialized service institutions, then the transactions processed by the system are cross-bank transactions; and if the acquiring party and the card-issuing party are cross-region, cross-nation banks or institutions, then the transactions processed by the system are cross-nation transactions.

BRIEF DESCRIPTION OF THE DRAWINGS

The invention will now be described in detail in conjunction with the drawings, however, the description of the embodiments are illustrative only, without limiting the scope of the invention.

DETAILED DESCRIPTION OF THE EMBODIMENTS

Figure 1:
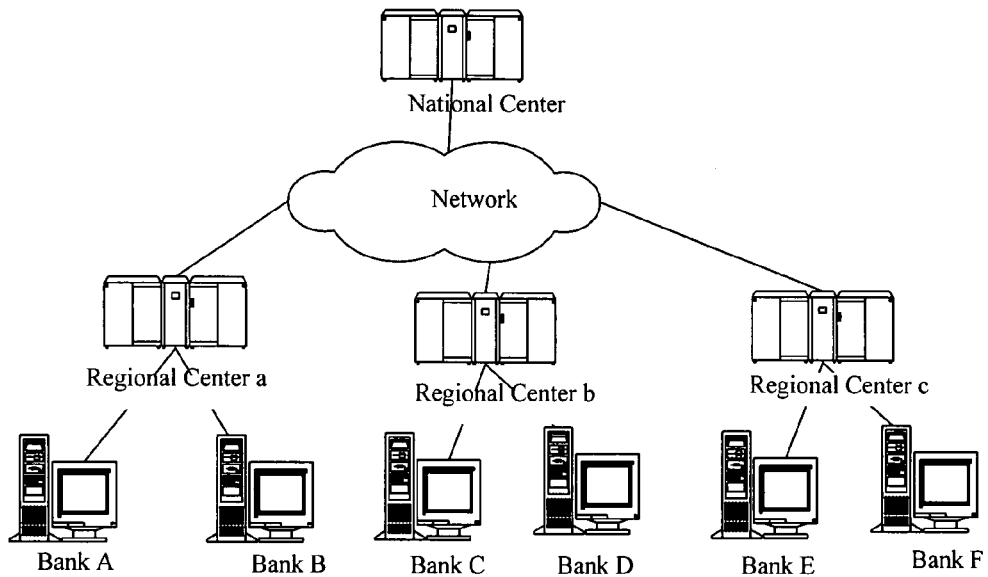
FIG. 1 is a structural representation of an existing exchange network.
Figure 2:
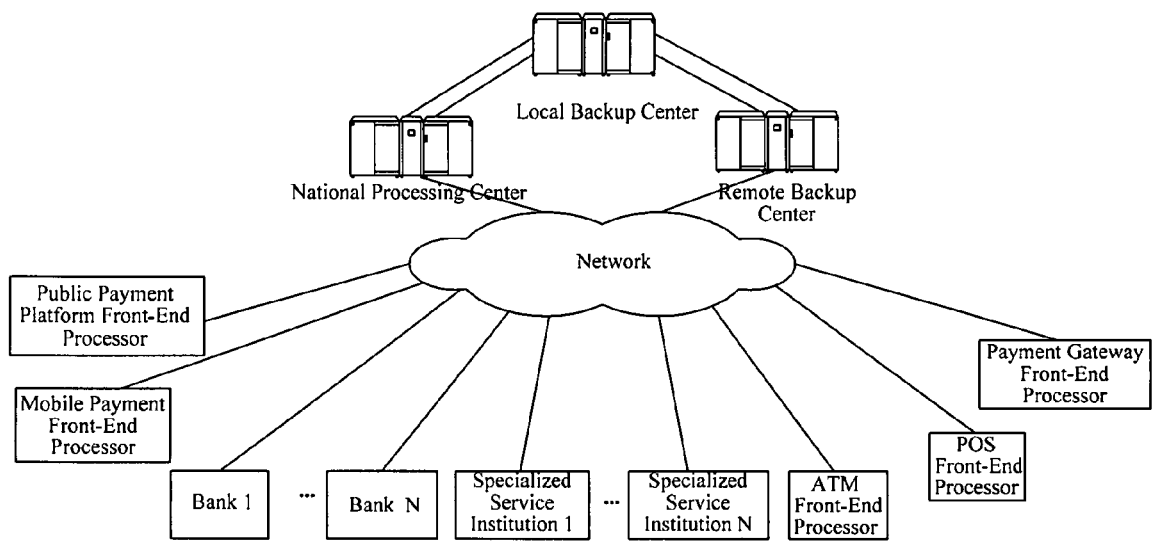
FIG. 2 is a structural representation of the network of the system according to the invention.

As shown in FIG. 2, which is a schematic diagram of a novel system according to the invention, as different from the systems of the prior art, the present system has a unified processing center and a corresponding local backup center and a remote backup center, etc., and no regional centers will exist any longer. Member institutions are connected to the processing center and the remote backup center directly via a network. Wherein, the processing center and the local backup center are connected directly, and the local backup center and the remote backup center are connected directly, while the processing center and the remote backup center are not connected directly. As shown in the figure, the member institutions include several banks, several specialized service institutions, several ATM front-end processors, several POS front-end processors, several payment gateway front-end processors, several mobile payment front-end processors and several public payment platform front-end processors.

The structure of the system according to the invention will be described in various aspects hereinafter.

Figure 3:
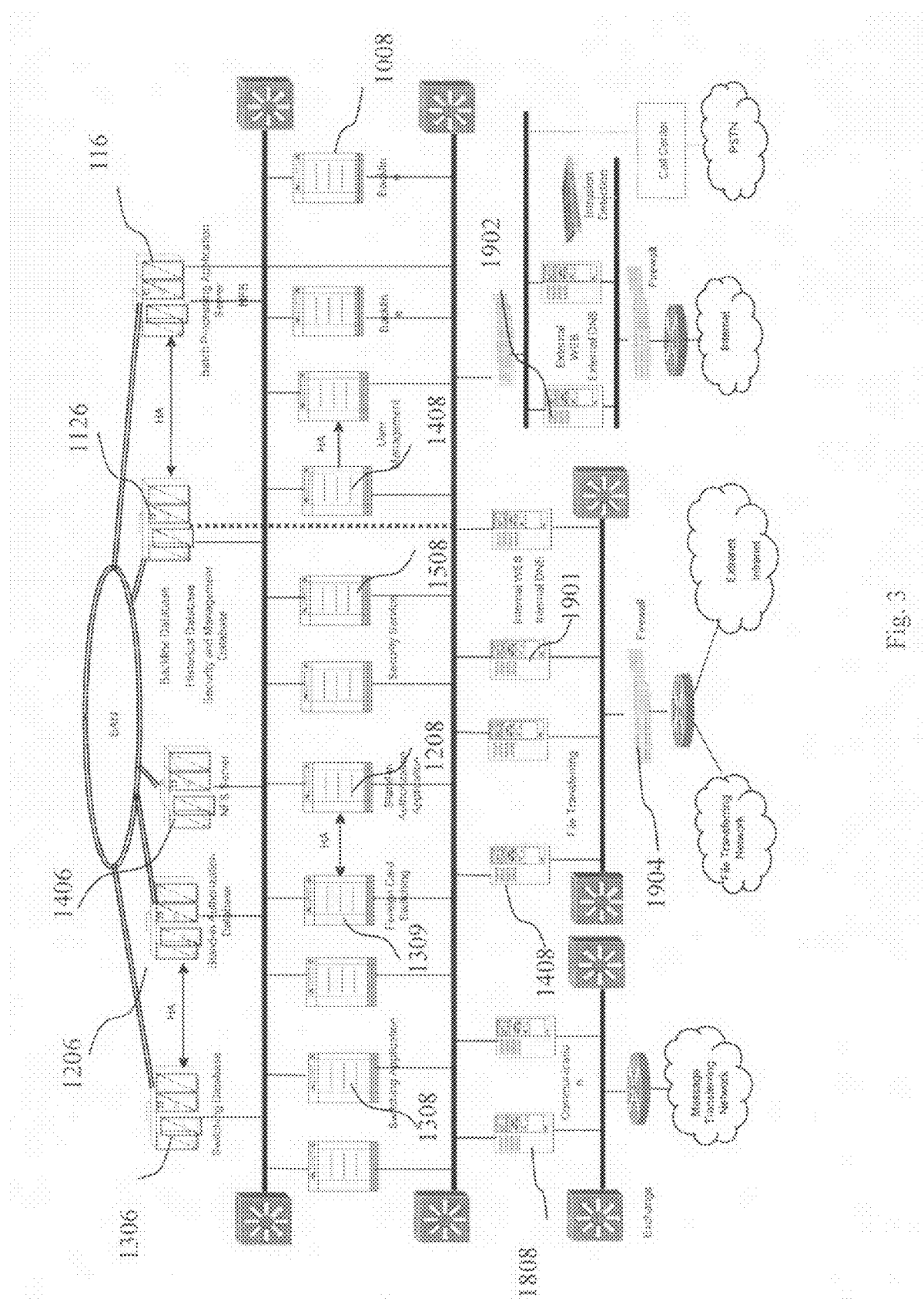
FIG. 3 is a schematic diagram showing the topological structure of the system according to the invention.

FIG. 3 is a schematic diagram showing the topological structure of the system. Wherein:

Communication server 1808: it is responsible for the communication access during an online transaction between member institutions 41, 42, other users 43 and the system.

Switching application server 1308: it is responsible for the switching of a local card transaction.

Switching database server 1306: it is responsible for storing transaction logs related to the switching. This server, the stand-in authorization database server 1206 and the security and management database server are mutual hot backup devices, that is, the switching database server, the stand-in authorization data server and the server on which the security and management database is arranged are all equipped with a corresponding database for switching, stand-in authorization, and security and management. During a transaction process, data corresponding to the switching, stand-in authorization and security is synchronistically recorded on the three servers, and when failure occurs on any one of the three servers, other servers will be used in place of the failed server immediately, so that the normal operation of the system may be ensured.

Foreign card switching application server 1309: it is responsible for the switching of a foreign card transaction. This server and the stand-in authorization application server 1208 are mutual hot backup devices.

Stand-in authorization application server 1208: it is responsible for processing a stand-in authorization transaction. This server and the foreign card switching application server 1309 are mutual hot backup devices.

Stand-in authorization database server 1206: it is responsible for storing data related to stand-in authorization. This server and the switching database server 1306 are mutual hot backup devices.

Security application server 1508: it is responsible for providing a centralized security service to all the subsystems in the frontline part except the switching application server and the foreign card switching application server. For the processing of switching and foreign card switching, in consideration of performance, an encryption device will be called directly, so that the processing speed may be increased and the switching throughput may be ensured.

File transferring application server 1408: it is responsible for the file transferring and processing between member institutions 41, 42, other users 43 and the system.

Internal WEB and DNS server 1901: it is responsible for the WEB access and domain name resolution of the Intranet and Extranet. Firewall 1904 is also arranged between the internal WEB and DNS server 1901 and the Intranet and Extranet, so that security control may be performed.

External WEB and DNS server 1902: it is responsible for the WEB access and domain name resolution of the Internet. A firewall is also arranged between the external WEB and DNS server 1902 and the Internet, so that security control may be performed.

User management application server 1048, which employs an LDAP (Lightweight Directory Access Protocol) server: it is responsible for the unified management on users of the whole application system. In LDAP, there are two mechanisms for realizing user data storage, i.e., dedicated hierarchical data storage and the direct use of universal relational database. This server employs a configuration with two servers so as to form primary-secondary mode.

Backline J2EE application server 1008: it is responsible for processing the online services of the whole backline subsystem, which employs a J2EE architecture.

Batch processing application server 116: it is responsible for the batch processing of transactions and the shared storing of files. This server and the backline data warehouse server 1126 are mutual hot backup devices.

Backline data warehouse server 1126: it is responsible for storing transaction data, configuration parameter, management parameter, transaction historical data, and transaction analyzing and security data, etc. of the whole application system. Three databases are established on this server, i.e., security and management database, backline database and historical database respectively. This server and the batch processing application server 116 are mutual hot backup devices. Wherein, the security and management database is mainly used for storing system online transaction security data and application system configuration data; the backline database is mainly used for storing a copy of batch processing log data, settlement detail data and institution information; and the historical database is mainly used for storing a copy of historical transaction data, intermediate statistical data and institution information.

NFS server 1406: it is responsible for providing a public file service to each subsystem via standard Network Files Service (NFS).

Figure 4:
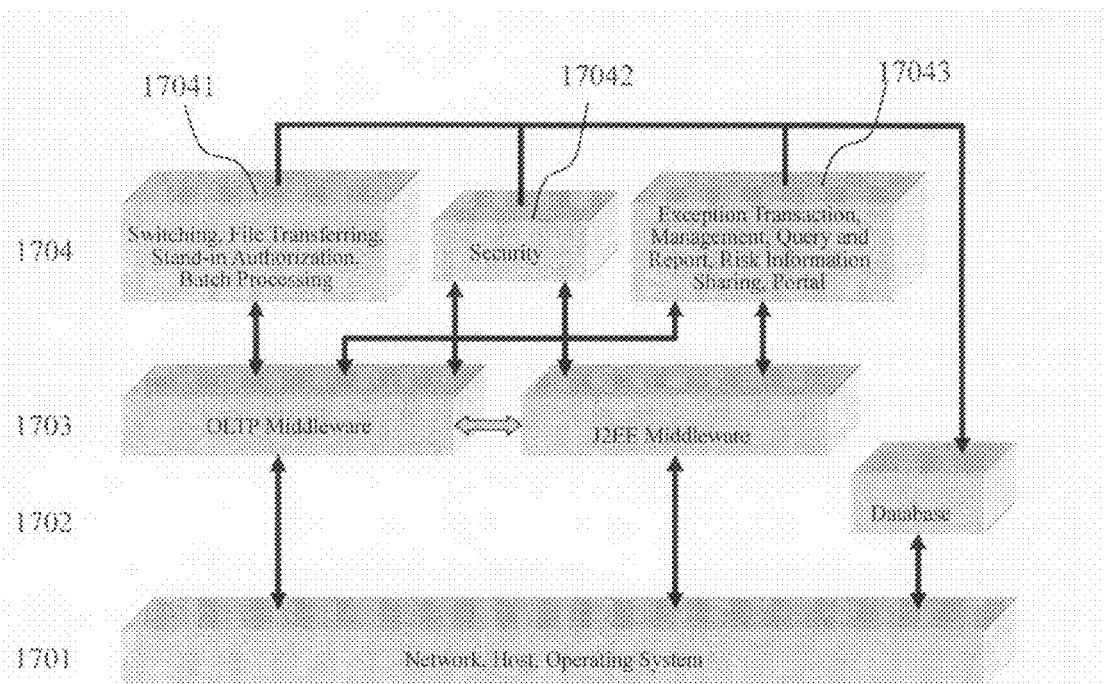
FIG. 4 is a schematic diagram showing the design structure of the system according to the invention.

The general hierarchical logical structure of the application system according to the invention is shown in FIG. 4, which mainly comprises infrastructure layer 1701, data processing layer 1702, middleware layer 1703 and application layer 1704, wherein the infrastructure layer 1701 includes a network, a host, an operating system, etc. of the invention; the data processing layer 1702 refers to various databases; the middleware layer 1703 is mainly divided into OLTP (Online Transaction Processing) middleware and J2EE (Java 2 Enterprise Edition) middleware; the application layer 1704 includes application ware 17041 for switching, file transferring, stand-in authorization and batch processing etc., security application ware 17042, and application ware 17043 for exception transaction, management, query and report, risk information share, and portal.

The OLTP middleware, the J2EE middleware and the databases are established based on the infrastructure layer 1701. At the same time, the OLTP middleware is connected with a switching subsystem, a file transferring subsystem, a stand-in authorization subsystem, a batch processing subsystem and a management service package; the J2EE middleware is connected with an exception transaction processing service package, a query and report service package, a risk information sharing service package and a portal. The subsystems connected respectively with the above middlewares may provide a sophisticated, high-efficiency inter-process communication mechanism, together with more effective operation managing and monitoring measures, so that the communication among subsystems will be more simple, reliable and secure, and a most effective load balancing capability, a better system availability and extensibility may be achieved.

In FIG. 4, although the management service package is shown as connected with an exception transaction processing service package, a query and report service package, a risk information sharing service package and a portal, in fact, it is connected with the OLTP middleware, rather than the J2EE middleware. The management service package is shown together with other parts of the backline subsystem simply because it also belongs to the backline subsystem.

Figure 5:
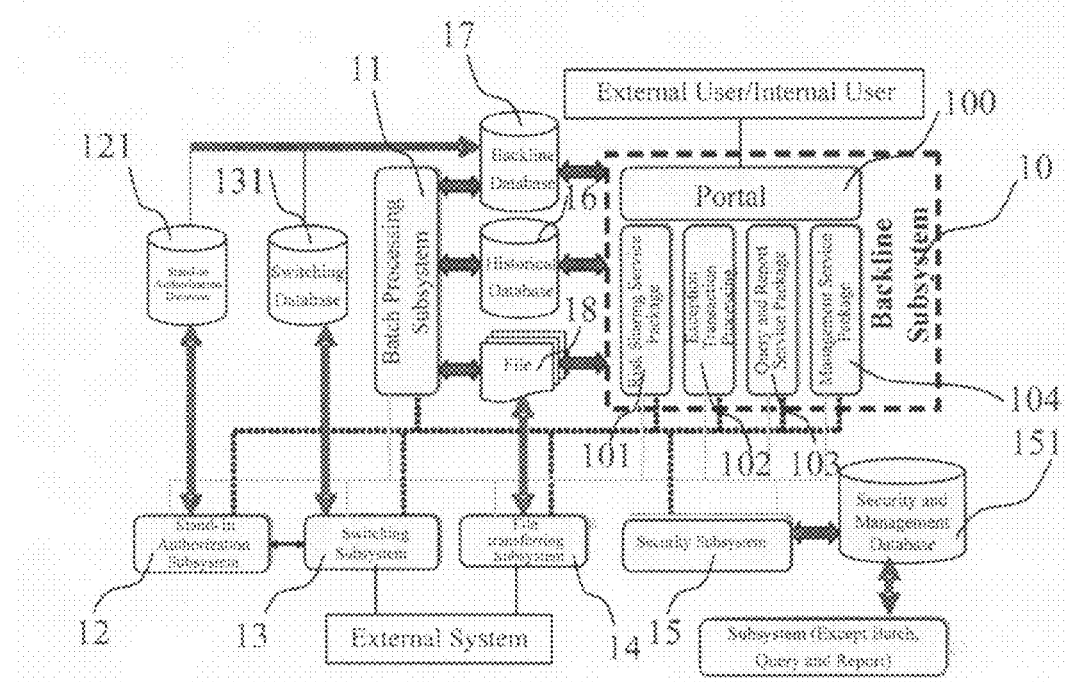
FIG. 5 is a schematic diagram showing the distribution structure of subsystems of the invention.

The distribution and the relationship between subsystems and other related service packages of the invention are shown in FIG. 5, wherein the system comprises all of the subsystems and the service packages. In FIG. 5, the dashed line refers to the direct communication relationship between each subsystem, the solid line refers to the communication relationship between the security subsystem and other subsystems, and the heavy solid line refers to database access or file access. The functions of each subsystem and service package are described briefly as follows:

Switching subsystem 13: it is responsible for connecting each member institution, receiving and forwarding a transaction request and a response, and providing a routing service and recording logs.

File transferring subsystem 14: it is responsible for the file transferring with the member institutions, and it is a main interface for file exchange between the system and the member institutions. Its main functions include external file transferring function, information exchange function with internal subsystems and file cleaning function. It is used for ensuring the smoothness of online transaction communication channel, and increasing the overall system operating efficiency.

Stand-in authorization subsystem 12: it is responsible for accomplishing stand-in authorization of a transaction according to the agreement with each member bank. Its functions specifically include quota control, accumulated amount control and accumulated transaction number control, etc., together with log recording, charge calculation, transaction check (such as security check and account validity check), etc.

Batch processing subsystem 11: it is responsible for clearing and settling a transaction in a way agreed on with a member institution. It supports self-determination settlement mode and unself-determination settlement mode, and supports single message and dual message settlement ways, and it is responsible for processing various transaction capital settlements and various service charge settlements. Such settlements include: settlement of capital and service charge of a transaction such as POS consumption, ATM cash withdrawal and so on; and profit allocation of service charge among the institutions participating in the transaction.

Exception transaction processing service package 102: it is responsible for processing the wrong account or suspicious account generated during a transaction. Its main functions include original transaction matching, exception transaction file processing, transaction period control and exception transaction settlement file generating, etc. it is used so that not only the efficiency of the system exchange network will not be affected, but also the exception transaction will be settled in time. It supports three access modes: online transaction (message delivery similar to that of a normal transaction), file transferring and Web (logging on a Web page).

Query and report service package 103: it is responsible for providing information query, report making, analyzing and obtaining to internal and external institutions. Its main functions include data collecting, online query, report making, report generating and report providing, etc., and it may also provide report customization function, so that it is very convenient and the system efficiency may also be increased.

Risk information sharing service package 101: it is responsible for collecting, processing and distributing various risk information, preventing a forbidden transaction from occurring, and lowering transaction risk, and internally sharing a list of payment forbidding, transaction rejection, forbidden cardholders, forbidden card-holding enterprises and forbidden merchants, etc. and the related detail records for the member institutions and the system.

Management service package 104: it is responsible for the unified management on member institution information and system parameters, and for the online management on the transferring and processing of a transaction. Its main functions include: adding, deleting, modifying, querying and activating of institution information and system parameters; online sign-in and sign-out; key reset; system monitoring, etc.

Service portal 100: it is responsible for providing a unified, easy-to-use operating interface with the uniform style to various operators of the system.

Security subsystem 15: it is responsible for providing security control measures at various layers, and ensuring that the system operates safely. Its main functions include user right control, user validity verification, key management, algorithm deposit, encryption and decryption, password check, file encryption control, MAC (Message Authentication Code) calculation and check, log recording and so on.

Wherein, the switching subsystem 13 is connected directly with the switching database 131, for writing data to and reading data from the switching database 131; the batch processing subsystem 11 is connected directly with the historical database 16, the backline database 17 and the file-sharing space 18, for reading data therefrom and writing data thereto; the stand-in authorization subsystem 12 is connected directly with the stand-in authorization database 121, for writing data to and reading data from the stand-in authorization database 121; at the same time, all of the subsystems and the service packages except the batch processing subsystem 11 and the query and report service package 103 are connected with the security and management database 151, for writing data to and reading data from the security and management database 151; the file transferring subsystem 14 is connected directly with the file-sharing space 18, for writing files thereto and reading files therefrom.

The switching database 131 and the stand-in authorization database 121 are both connected logically with the historical database 16 and the backline database 17, and the management service package 104 starts a data transfer program to write a switching log and a stand-in authorization log to the historical database 16 and the backline database 17; the batch processing subsystem 11 reads a switching log, a stand-in authorization log, an exception transaction processing log and so on from the backline database 17, performs clearing and settlement, and writes a settlement result to the backline database 17; at the same time, the batch processing subsystem 11 generates several files and writes them to the file-sharing space 18.

The risk sharing service package 101, the exception transaction processing service package 102, the query and report service package 103 and the management service package 104 appear together in the form of backline subsystem 10, and the unified portal 100 is arranged for interacting with external users or internal users. The backline subsystem 10 is directly connected with the historical database 16, the backline database 17 and the file-sharing space 18, for reading data therefrom and writing data thereto.

Direct data communication occurs between each subsystem and service package. At the same time, each subsystem and service package is connected with the security subsystem and obtains the corresponding security service.

The switching subsystem 13 and the file transferring subsystem 14 are connected with an external system and can receive a transaction request or an uploaded file from the external system. After processing, the switching subsystem 13 or the file transferring subsystem 14 returns the corresponding processing result to the external system in the form of a message or file.

The core parts of the system are the switching subsystem and the batch processing subsystem, with which the basic function of the system, i.e., switching and settlement, may be realized. When the system only has the above two subsystems, the distribution relationship of the subsystems is shown as in FIG. 6, wherein:

The switching subsystem 13 is connected directly with the switching database 131, for writing data to and reading data from the switching database 131; the batch processing subsystem 11 is directly connected with the historical database 16 and the backline database 17, for reading data therefrom and writing data thereto.

The switching database 131 is connected logically with the backline database 17, and writes a switching log to the backline database 17 by a data transfer program; the batch processing subsystem 11 reads the switching log from the backline database 17, performs clearing and settlement, and writes a settlement result to the backline database 17. In such a case, the batch processing subsystem 11 no longer generates files, instead, it feeds back the settlement result to an external system via the switching subsystem 13.

Direct data communication occurs between the switching subsystem 13 and the batch processing subsystem 11.

The switching subsystem 13 is connected with an external system, and it can receive a transaction request sent from the external system. After processing, switching subsystem 13 returns the corresponding processing result to the external system.

Figure 6:
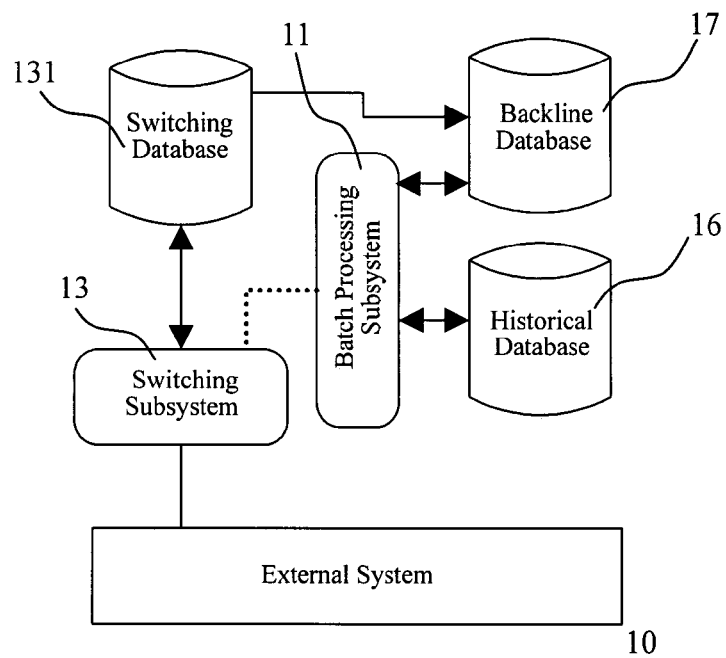
FIG. 6 is a schematic diagram showing the distribution structure of subsystems when the system of the invention only has a switching subsystem and a batch processing subsystem.
Figure 7:
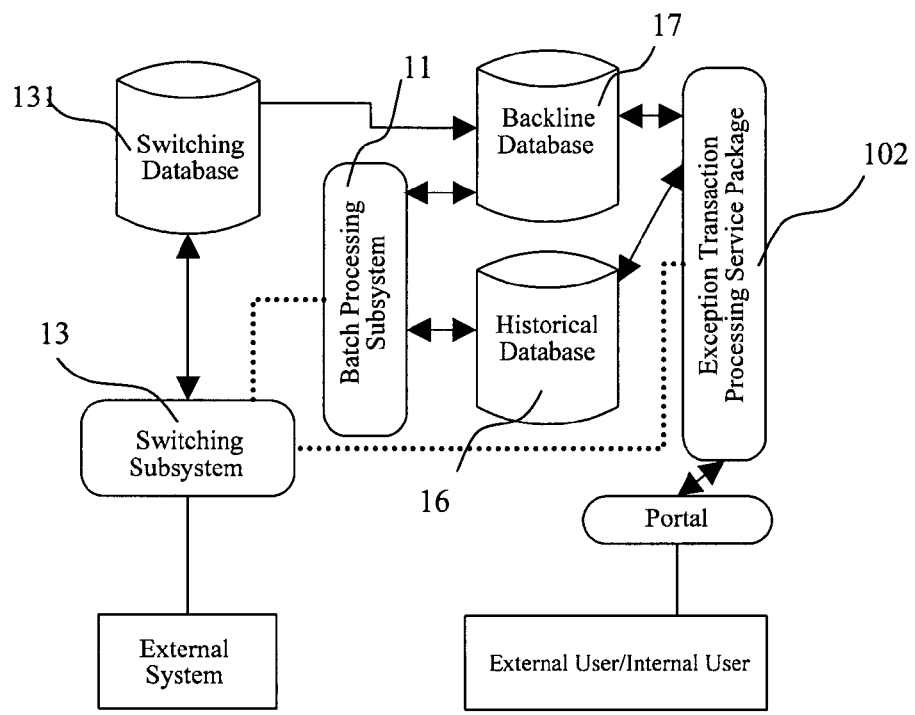
FIG. 7 is a schematic diagram showing the distribution structure of subsystems when the system of the invention has a switching subsystem, a batch processing subsystem and an exception transaction processing service package.

Based on FIG. 6, if an exception transaction processing service package is added, then the system may realize exception transaction processing, in addition to switching and settlement, so that the functions of the system may be reinforced. when the system has the above switching subsystem and batch processing subsystem, as well as an exception transaction processing service package, the distribution relationship of the subsystems is shown as in FIG. 7, wherein:

The switching subsystem 13 is connected directly with the switching database 131, for writing data to and reading data from the switching database 131; the batch processing subsystem 11 is directly connected with the historical database 16 and the backline database 17, for reading data therefrom and writing data thereto; and the exception transaction processing service package is directly connected with the historical database 16 and the backline database 17, for reading data therefrom and writing data thereto.

The switching database 131 is connected logically with the backline database 17, and writes a switching log to the backline database 17 by a dxta transfer program; the batch processing subsystem 11 reads the switching log from the backline database 17, performs clearing and settlement, and writes a settlement result to the backline database 17. In such a case, the batch processing subsystem 11 no longer generates files, instead, it feeds back the settlement result to an external system via the switching subsystem 13.

The exception transaction processing service package 102 is connected directly with a portal, and an external user or an internal user initiates an exception transaction processing transaction to the exception transaction processing service package 102 by logging in the portal. After processing, the exception transaction processing service package 102 writes a processing result to the backline database 17, at the same time, it returns the processing result to the portal. Then the portal sends the processing result to the initiating party or the receiving party.

Direct data communication occurs among the switching subsystem 13, the batch processing subsystem 11 and the exception transaction processing service package 102.

The switching subsystem 13 is connected with an external system, and it can receive a transaction request sent from the external system. After processing, the switching subsystem 13 returns the corresponding processing result to the external system.

Based on FIG. 7, if a security subsystem is further added, then the system may realize effective security control, in addition to switching, settlement and exception transaction processing, so that system security may be improved. When the system has a switching subsystem, a batch processing subsystem, a security subsystem and an exception transaction processing service package, the distribution relationship of the subsystems is shown as in FIG. 8, wherein:

The switching subsystem 13 is connected directly with the switching database 131, for writing data to and reading data from the switching database 131; the batch processing subsystem 11 is directly connected with the historical database 16 and the backline database 17, for reading data therefrom and writing data thereto; the exception transaction processing service package 102 is connected directly with the historical database 16 and the backline database 17, for reading data therefrom and writing data thereto; all of the subsystems, including the exception transaction processing service package 102, are connected with the security and management database 151, for reading data therefrom and writing data thereto.

The switching database 13 is connected logically with the backline database 17, and writes a switching log to the backline database 17 by a data transfer program; the batch processing subsystem 11 reads the switching log from the backline database 17, performs clearing and settlement, and writes a settlement result to the backline database 17. In such a case, the batch processing subsystem 11 no longer generates files, instead, it feeds back the settlement result to an external system via the switching subsystem 13.

The exception transaction processing service package 102 is connected directly with a portal, and an external user or an internal user initiates an exception transaction processing transaction to the exception transaction processing service package 102 by logging in the portal. After processing, the exception transaction processing service package 102 writes a processing result to the backline database 17, at the same time, it returns the processing result to the portal. Then the portal sends the processing result to the initiating party or the receiving party.

The security subsystem 15 maintains data in a security database, and performs functions such as user right control, user validity verification, key management, algorithm deposit, encryption and decryption, password check, file encryption control, MAC (Message Authentication Code) calculation and check, log recording and so on, according to the data therein.

Direct data communication occurs among the switching subsystem 13, the batch processing subsystem 11, the exception transaction processing service package 102 and the security subsystem 15; the switching subsystem 13, the batch processing subsystem 11 and the exception transaction processing service package 102 all need to call a security service provided by the security subsystem 15, so as to accomplish necessary security check, and this relationship is omitted in the figure.

The switching subsystem 13 is connected with an external system, and it can receive a transaction request sent from the external system. After processing, the switching subsystem 13 returns the corresponding processing result to the external system.

Figure 8:
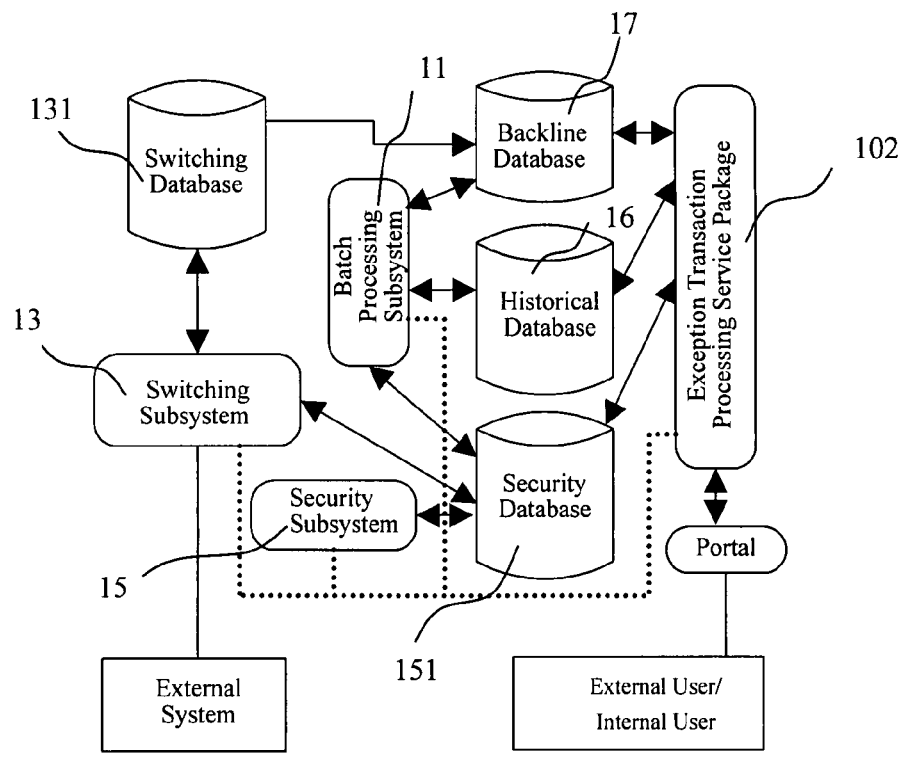
FIG. 8 is a schematic diagram showing the distribution structure of subsystems when the system of the invention only has a switching subsystem, a batch processing subsystem, a security subsystem and an exception transaction processing service package.
Figure 9:
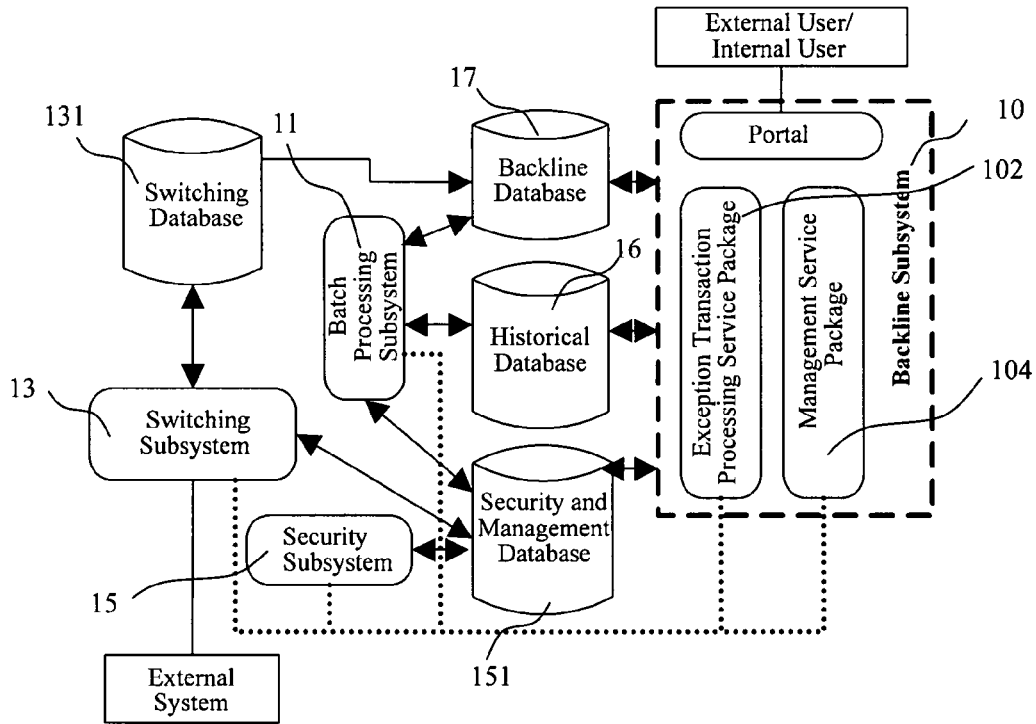
FIG. 9 is a schematic diagram showing the distribution structure of subsystems when the system of the invention only has a switching subsystem, a batch processing subsystem, a security subsystem, an exception transaction processing service package and a management service package.

Based on FIG. 8, if a management service package is further added, then the system may realize functions such as management on member institutions and effective management on parameters, in addition to switching and settlement, exception transaction processing and security control. when the system has a switching subsystem, a batch processing subsystem, a security subsystem, an exception transaction processing service package and a management service package, the distribution relationship of the subsystems is shown as in FIG. 9, wherein:

The exception transaction processing service package 102 and the management service package 104 exist in the system in the form of backline subsystem 10, and they are configured with a unified portal. The above two service packages are both connected directly with the portal and interact with external users or internal users via the portal.

The switching subsystem 13 is connected directly with the switching database 131, for writing data to and reading data from the switching database 131; the batch processing subsystem 11 is directly connected with the historical database 16 and the backline database 17, for reading data therefrom and writing data thereto; the exception transaction processing service package 102 is connected directly with the historical database 16 and the backline database 17, for reading data therefrom and writing data thereto; all of the subsystems are connected with the security and management database 151, for reading data therefrom and writing data thereto.

The switching database 131 is connected logically with the backline database 17, and writes a switching log to backline database 17 by a data transfer program; the batch processing subsystem 11 reads the switching log from the backline database 17, performs clearing and settlement, and writes a settlement result to the backline database. In such a case, the batch processing subsystem 11 no longer generates files, instead, it feeds back the settlement result to an external system via the switching subsystem 13.

An external user or an internal user initiates an exception transaction processing transaction to the exception transaction processing service package 102 by logging in the portal. After processing, the exception transaction processing service package 102 writes a processing result to the backline database 17, at the same time, it returns the processing result to the portal. Then the portal sends the processing result to the initiating party or the receiving party.

Likewise, an external user or an internal user sends a parameter modification request and so on to the management service package 104 by logging in the portal. After processing, the management service package 104 writes a processing result to the security and management database 151, at the same time, it returns the processing result to the portal. Then the portal sends the processing result to the initiating party or the receiving party.

The security subsystem 15 maintains security-related data in the security and management database, and performs functions such as user right control, user validity verification, key management, algorithm deposit, encryption and decryption, password check, file encryption control, MAC (Message Authentication Code) calculation and check, log recording and so on, according to the data therein.

Direct data communication occurs among the switching subsystem 13, the batch processing subsystem 11, the exception transaction processing service package 102, the management service package 104 and the security subsystem 15; the switching subsystem 13, the batch processing subsystem 11 and the exception transaction processing service package 102 all need to call a security service provided by the security subsystem 15, so as to accomplish necessary security check, and this relationship is omitted in the figure.

The switching subsystem 13 is connected with an external system, and it can receive a transaction request sent from the external system. After processing, the switching subsystem 13 returns the corresponding processing result to the external system.

Figure 10:
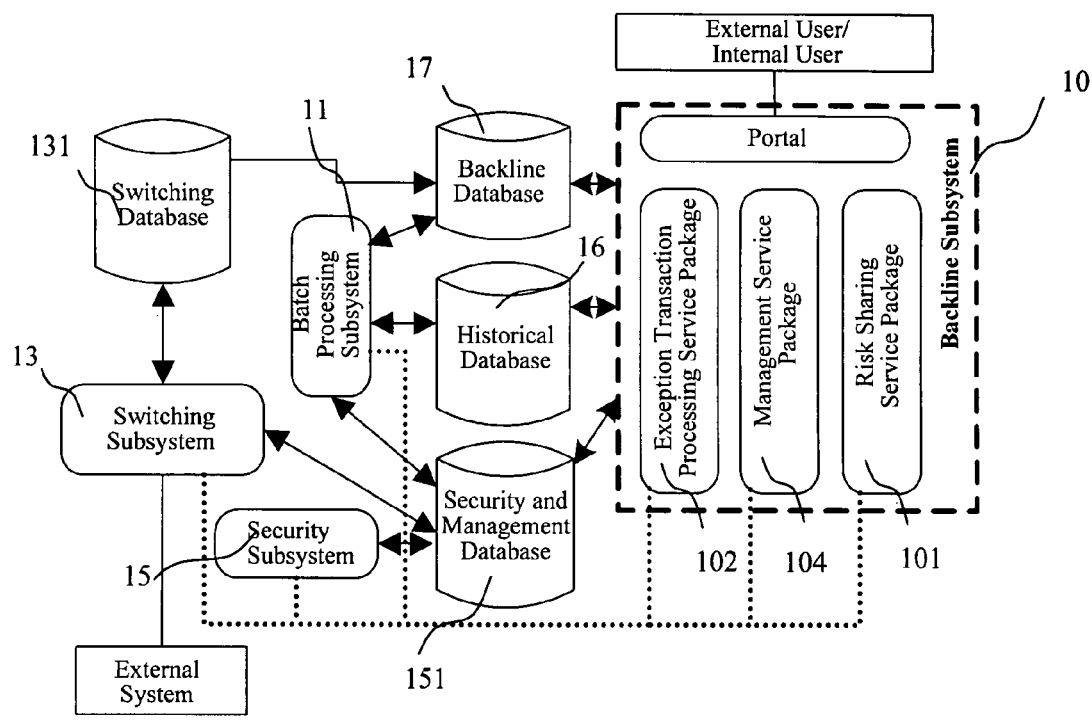
FIG. 10 is a schematic diagram showing the distribution structure of subsystems when the system of the invention only has a switching subsystem, a batch processing subsystem, a security subsystem, an exception transaction processing service package, a management service package and a risk sharing service package.

Based on FIG. 9, if a risk sharing service package is further added, then the system may realize a risk information service, in addition to functions such as switching and settlement, exception transaction processing, security control and parameter management. when the system has a switching subsystem, a batch processing subsystem, a security subsystem, an exception transaction processing service package, a management service package and a risk sharing service package, the distribution relationship of the subsystems is shown as in FIG. 10. Since the relationship therein is similar to that in FIG. 9, the description thereof will be omitted.

Figure 11:
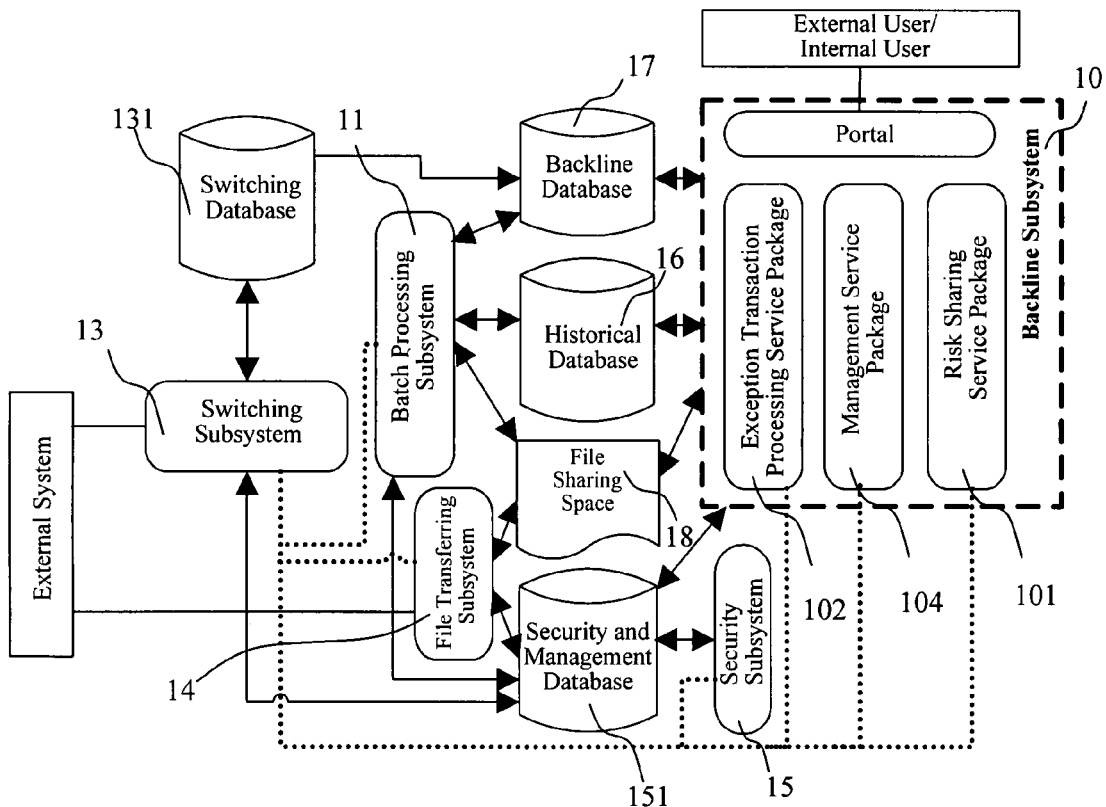
FIG. 11 is a schematic diagram showing the distribution structure of subsystems when the system of the invention is only lack of a query and report service package and a stand-in authorization subsystem.

Based on FIG. 10, if a file transferring subsystem is further added, then the system may realize batch file processing, in addition to switching and settlement, exception transaction processing, security control, parameter management and risk information service. when the system has a switching subsystem, a batch processing subsystem, a security subsystem, an exception transaction processing service package, a management service package, a risk sharing service package and a file transferring subsystem, the distribution relationship of the subsystems is shown as in FIG. 11, wherein:

The exception transaction processing service package 102, the management service package 104 and the risk sharing service package 101 exist in the system in the form of backline subsystem 10, and they are configured with a unified portal. The above three service packages are all connected directly with the portal, and interact with external users or internal users via the portal.

The switching subsystem 13 is connected directly with the switching database 131, for writing data to and reading data from the switching database 131; the batch processing subsystem 11 is connected directly with the historical database 16, the backline database 17 and the file-sharing space 18, for reading data therefrom and writing data thereto; the backline subsystem 10 is connected directly with the historical database 16, the backline database 17 and the file-sharing space 18, for reading data therefrom and writing data thereto; all of the subsystems are connected with the security and management database 151, for reading data therefrom and writing data thereto; the file transferring subsystem 14 is connected directly with the file-sharing space 18, for reading files therefrom and writing files thereto.

The switching database 131 is connected logically with the backline database 17, and the management service package 104 starts a data transfer program to write a switching log to the backline database 17; the batch processing subsystem reads the switching log from the backline database 17, performs clearing and settlement, and writes a settlement result to the backline database 17. In such a case, the batch processing subsystem 11 generates a clearing file and writes it to the file-sharing space 18.

An external user or an internal user initiates an exception transaction processing transaction to the exception transaction processing service package 102 by logging in the portal. After processing, the exception transaction processing service package 102 writes a processing result to the backline database 17, at the same time, it returns the processing result to the portal. Then the portal sends the processing result to the initiating party or the receiving party.

Likewise, an external user or an internal user sends a parameter modification request and so on to the management service package 104 by logging in the portal. After processing, the management service package 104 writes a processing result to the security and management database 151, at the same time, it returns the processing result to the portal. Then the portal sends the processing result to a member institution.

Similarly, an external user or an internal user sends risk management information to the risk sharing service package by logging in the portal. After processing, the risk sharing service package returns a processing result to the portal, and then the portal sends the processing result to the initiating party.

The security subsystem 14 maintains security-related data in the security and management database, and performs functions such as user right control, user validity verification, key management, algorithm deposit, encryption and decryption, password check, file encryption control, MAC (Message Authentication Code) calculation and check, log recording and so on, according to the data therein.

Direct data communication occurs among the switching subsystem 13, the batch processing subsystem 11, the exception transaction processing service package 102, the management service package 104, the risk sharing service package 101, the security subsystem 15 and the file transferring subsystem 14; the switching subsystem 13, the batch processing subsystem 11, the backline subsystem 10 and the file transferring subsystem 14 all need to call a security service provided by the security subsystem 15, so as to accomplish necessary security check, and this relationship is omitted in the figure.

The switching subsystem 13 and the file transferring subsystem 14 are connected with an external system, and can receive a transaction request or an uploaded file from the external system. After processing, the switching subsystem 13 or the file transferring subsystem 14 returns the corresponding processing result to the external system in the form of a message or file.

Figure 12:
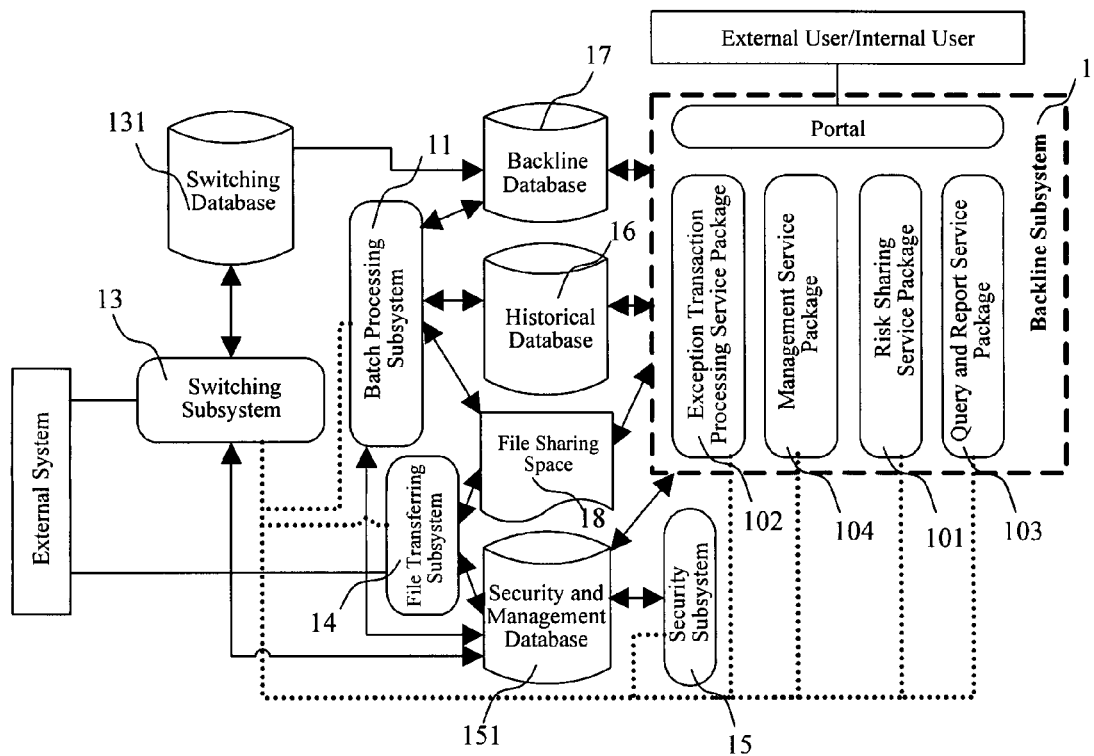
FIG. 12 is a schematic diagram showing the distribution structure of subsystems when the system of the invention is only lack of a stand-in authorization subsystem.

Based on FIG. 11, if a query and report service package is further added, then the system may realize query processing and report processing, in addition to switching and settlement, exception transaction processing, security control, parameter management, risk information service and batch file processing. When the system has a switching subsystem, a batch processing subsystem, a security subsystem, a file transferring subsystem, an exception transaction processing service package, a management service package, a risk sharing service package and a query and report service package, the distribution relationship of the subsystems is shown in FIG. 12. Since the relationship therein is similar to that in FIG. 11, the description thereof will be omitted.

Based on FIG. 12, if a stand-in authorization subsystem is further added, then the system will have all of the above functions as shown in FIG. 4, and it will not be described again here.

Figure 13:
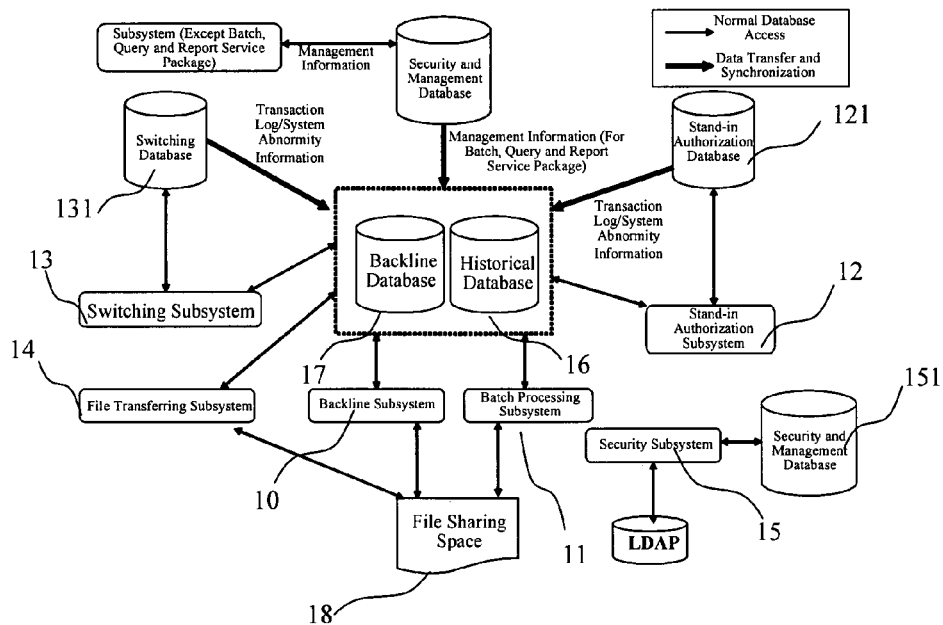
FIG. 13 is a schematic diagram showing data distribution and access relationship of the system according to the invention.

The database distribution and access structure of the system is shown in FIG. 13, wherein the single line refers to normal database access, the double line refers to data transfer and synchronization.

The switching database 131 stores switching transaction log information, authorization history log information, refund history information in recent 45 days, store-and-forward information, abnormity log information, synchronization temporary table, management log table and system event reporting table, etc. Wherein, the switching transaction log information, the store-and-forward information, the system abnormity log information, the synchronization temporary table, the management log table and the system event reporting table employ a double-table configuration, and data in the switching database 131 will be transferred to a remote backup center according to disaster recovery requirements of the system.

The stand-in authorization database 121 stores stand-in authorization log information, stand-in authorization number management information, stand-in authorization statistical information and system event reporting table, etc. Wherein, the stand-in authorization log, the stand-in authorization number management and the system event reporting table employ a double-table configuration, which can also meet disaster recovery requirements of the system.

Files stored in the file-sharing space 18 include: a dual message settlement file, an IC card settlement file, a chronological file, an exception transaction file, a stand-in collection/stand-in payment file, a shared information file, a report file and so on, which can also meet disaster recovery requirements of the system.

Transaction security data are stored in the LDAP (Lightweight Directory Access Protocol) server, which is a user application server employing LDAP mechanism. Specifically, the transaction security data includes various data key information, security subsystem configuration information, security audit information, etc.; and identity authentication data, which specifically include user attribute, right information etc.

Security data and management data that have a small volume and change infrequently are stored in the security and management database 151. This database is accessed by all of the subsystems.

The historical database 16 stores transaction log data, abnormity log data and a system event reporting table transferred from the switching database and the stand-in authorization database by a data transfer program, a system event reporting table transferred from other databases, and various summary tables and historical transaction logs that are required to be stored for a long term.

The backline database 17 is used for storing transaction log data, settlement-generated data, management transaction log data, exception transaction processing transaction logs and risk data transferred from the switching database and the stand-in authorization database.

The switching subsystem 13 is connected with the switching database 131 and the security and management database 151, for reading data therefrom or writing data thereto; the stand-in authorization subsystem 12 is connected with the stand-in authorization database 121 and the security and management database 151, for reading data therefrom or writing data thereto; the batch processing subsystem 11 is connected with the backline database 17, the historical database 16, the security and management database 151 and the file-sharing space 18, for reading data therefrom or writing data thereto; the security subsystem 15 is connected with the security and management database 151 and the user management application server, for reading data therefrom or writing data thereto; the backline subsystem 10 is connected with the backline database 17, the historical database 16 and the file-sharing space 18, for reading data therefrom or writing data thereto; the file transferring subsystem 14 is connected with the security and management database 151 and the file-sharing space 18, for reading data therefrom or writing data thereto; at the same time, in order to improve system processing efficiency and to be processed via the batch processing subsystem, the system starts a data transfer program via the management service package to transfer switching logs in the switching database 131, stand-in authorization logs in the stand-in authorization database 121 and abnormity information and system event report in the security and management database 151 to the historical database 16 and the backline database 17, so as to be ready for being further processed; the management service package 104 in the backline subsystem will modify the corresponding parameters stored in the security and management database 151. After the modification comes into effect, each subsystem reads the modified parameters synchronistically and updates its memory synchronistically, so that synchronization of parameter data can be realized.

After the above database division, in order to prevent the processing performance from being lowered due to simultaneous access of the security and management database (such as institution information) and the backline database/the historical database required by some batch processing operations and query and report operations, a copy will be reserved in the backline database and the historical database, and data consistency protection will be realized by a way of two-stage submission.

Figure 14:
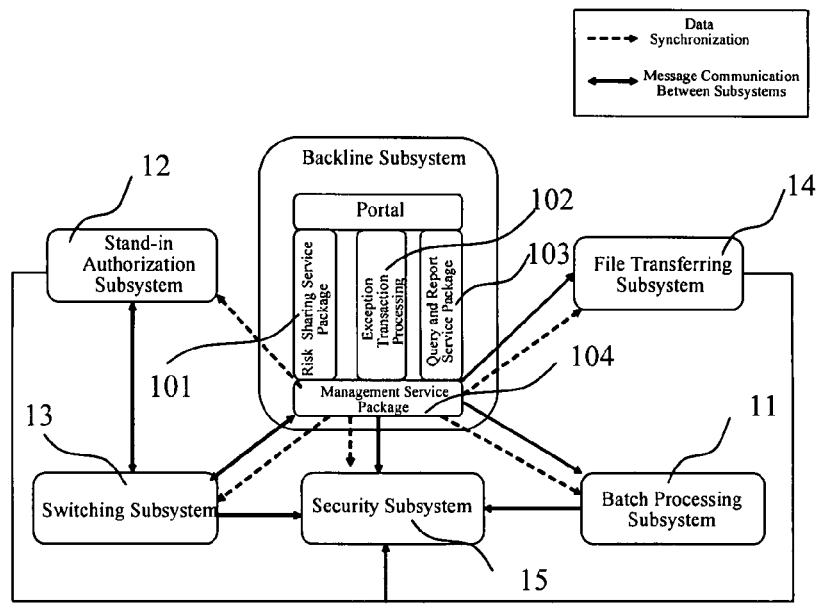
FIG. 14 is a schematic diagram showing the call relationship between subsystems of the invention.

FIG. 14 is a schematic diagram showing the relationship among the subsystems of the invention, wherein the switching subsystem 13 is connected with the stand-in authorization subsystem 11 and communicates by the mutual sending of messages; the switching subsystem 13 is connected with the management service package 104 and communicates via the mutual sending of messages; the switching subsystem 13 is connected with the exception transaction processing service package 102 and communicates via the mutual sending of messages; the security subsystem 15 is connected with the other subsystems, and the security service of the security subsystem 15 will be called by the other subsystems. During message communication, the switching subsystem 13 is the core of the whole system, and it is responsible not only for the message switching between external institutions, but also for the exchange message switching between each internal subsystem and the external institutions; at the same time, in another type of message communication, the management service package 104 sends management control commands to the other subsystems, such as starting a batch processing, starting a cut-off and so on; and the management service package 104 realizes data synchronization by updating management parameters stored in the security and management database 151.

Figure 15:
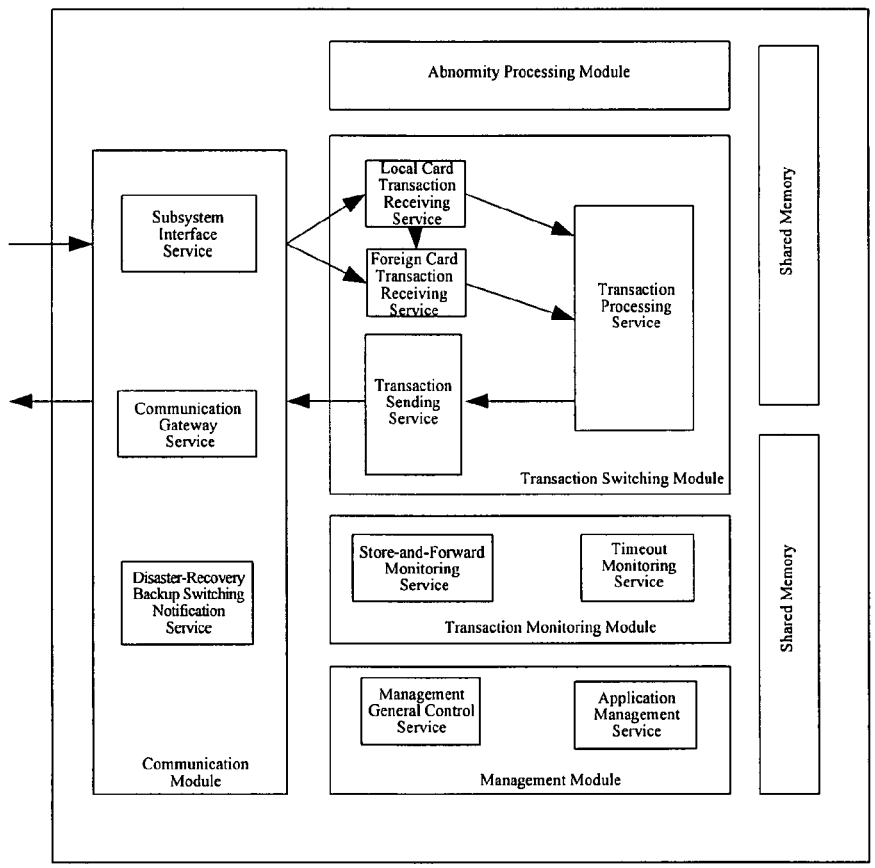
FIG. 15 is a structure diagram of the constitution of a switching subsystem.

FIG. 15 is a structure diagram of the constitution of the switching subsystem, which comprises a communication module, a transaction switching module, a transaction monitoring module, an abnormity processing module and a management module. Wherein, the communication module further comprises a communication gateway service submodule, a subsystem interface service submodule and disaster-recovery backup switching notification service submodule, which are independent from each other; the transaction switching module further comprises a transaction receiving service submodule, a transaction processing service submodule and a transaction sending service submodule; the transaction monitoring module further comprises a timeout monitoring service submodule and a store-and-forward monitoring service submodule.

The function of the communication module is only limited to communication, wherein the communication gateway service submodule is responsible for managing the connection with each member institution; the subsystem interface service submodule is responsible for the communication between the internal subsystems and the switching subsystem; the disaster-recovery backup switching notification service submodule is responsible for receiving instructions from a management general control service, establishing a duplex connection with a member institution, and sending a disaster-recovery backup switching notification to the member institution, in case of disaster-recovery backup.

Specifically, the transaction switching module, which is the core of the switching subsystem, is responsible for forwarding transaction service processing. Wherein, the transaction receiving service submodule is responsible for converting messages, and obtaining critical transaction information needed by the switching subsystem from the messages. The transaction receiving service is divided into foreign card transaction receiving service and local card transaction receiving service. All of the transactions are firstly received via the local card transaction receiving service. This service determines whether a transaction is local card transaction, if yes, then it delivers the transaction to the transaction processing service directly; otherwise, it delivers the transaction to the foreign card transaction receiving service, and then the foreign card transaction receiving service delivers the transaction to the transaction processing service submodule. The transaction processing service submodule processes all the transactions entering the switching subsystem, including requests sent form an acquiring party, responses returned by a card-issuing party and transactions sent from other subsystems in the processing center, and stores the message information into a database. The transaction sending service submodule is responsible for accomplishing operations related to message sending etc., wherein all of the outgoing messages sent from the switching subsystem must be accomplished by this submodule, specifically including receiving internal transaction messages delivered by the transaction processing service submodule, the store-and-forward monitoring service submodule and the abnormity processing module; determining routing information of a message according to a card BIN (Bank Identification Number), a transaction code and an institution code contained in the message; performing security check operation on the message, including MAC (Message Authentication Code) generation, ARPC (Authorization Response Cryptogram) generation and ARQC (Authorization Request Cryptogram) verification, etc; if the message is to be sent to a member institution, performing a packetizing operation, and then sending the message to a communication gateway, and if the message is to be sent to the other internal subsystems, then calling the subsystem interface service to deliver the message to the other internal subsystems for processing.

The above MAC generation is used for checking the validity of the message source; the ARPC generation is used for authenticating the card-issuing bank by the card in an IC card transaction; and the ARQC verification is used for authenticating the card by the card-issuing bank in an IC card transaction.

The transaction monitoring module performs timeout monitoring on a transaction request sent to the card-issuing party, and monitors and manages a store-and-forward transaction. Wherein, the timeout monitoring service submodule performs timeout control on all authorization-type transactions and finance-type transactions; the store-and-forward service submodule is responsible for sending transaction request data of refund, reversal, deposit confirmation, transfer-in confirmation, settlement notification and exception transaction processing notification to the card-issuing party once at a certain time interval, until transaction response data is returned from the card-issuing party.

The abnormity processing module receives abnormal processing requests from other services of the switching subsystem and records error logs, and determines whether to send a reject response to the acquiring party, or whether to initiate a reversal request to the card-issuing party, according to transaction request/response type, service name, error code, transaction type (transaction code) and so on related to the abnormity.

As described at the beginning, the system according to the invention has two main functions of transaction and settlement, and it may be an acquiring network and a settlement network of various bankcards at the same time. Therefore, according to functional classification, the settlement system is a very important part. The fund settlement service of the processing center 1 includes clearing, settlement and fund transfer. Similarly, according to different settlement modes, the clearing mode may be divided into self-determination clearing and unself-determination clearing.

Figure 16:
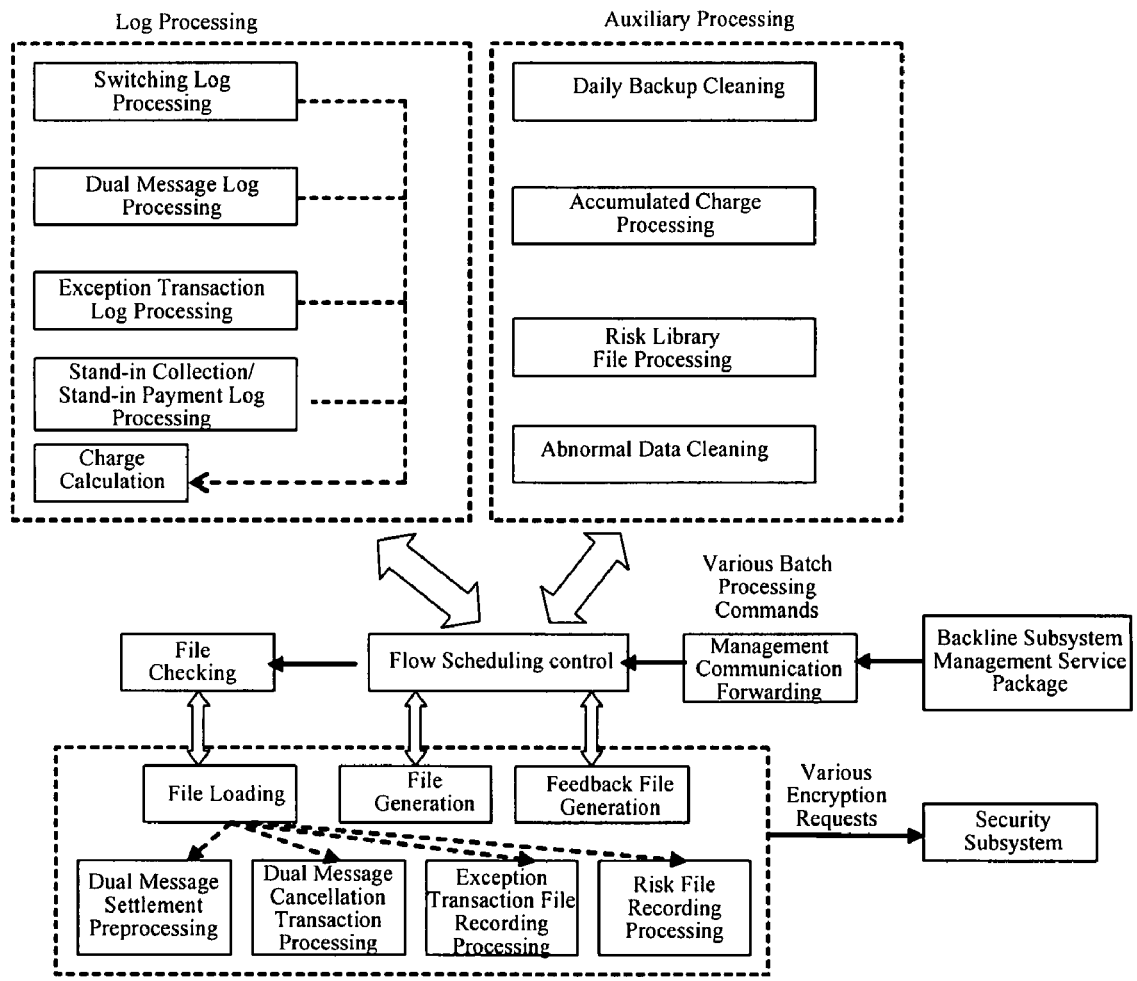
FIG. 16 is a block diagram of a batch processing subsystem of the invention which employs a self-determination settlement system.

FIG. 16 is a block diagram of the batch processing subsystem employing self-determination settlement system, which comprises a management communication forwarding module, a flow scheduling control module, a file checking module, a log and charge processing module, a file processing module and an auxiliary processing module. Wherein, the management communication forwarding module, the flow scheduling control module and the file checking module belong to a control module.

The flow scheduling control module, which is the core of the whole batch processing subsystem, mainly performs message transferring (via the management communication forwarding module) with other subsystems, process scheduling and so on. It schedules other modules orderly via flow scheduling control according to a predefined processing flow, so that all the service-required functions of the batch processing subsystem, except file processing (checking and loading), may be realized.

The file checking module continually queries a file information table at a predetermined time interval, and sends file information to a file loading module when it finds that file reception is completed.

The log and charge processing module performs log clearing and service charge calculation. Specifically, this module further comprises a switching log processing submodule, a dual message log processing submodule, a stand-in collection and stand-in payment log processing submodule and an exception transaction log processing submodule. Wherein, the switching log processing submodule performs switching log clearing by using multiple processes; the dual message log processing submodule provides multiple processes for performing dual message log clearing; the stand-in collection and stand-in payment log processing submodule provides multiple processes for performing stand-in collection and stand-in payment log clearing; the exception transaction log processing submodule is used for charging and clearing exception transaction logs.

The file processing module is mainly used for the distributing and loading of files, which specifically comprises a file loading submodule, a file generating submodule and a feedback file generating submodule. Wherein, the file loading submodule is a set of file loading service processes corresponding to different file formats, for loading file records to the corresponding database tables (or intermediate tables), specifically including dual message settlement preprocessing, dual message cancellation transaction processing, exception transaction file recording processing and risk file recording processing; the file generating submodule is used for writing database table records to a file in a predetermined format, and it is a set of file generating service processes corresponding to different file formats; the feedback file generating submodule is used for writing database table reject or feedback (statistical) records into a file in a predetermined format.

The auxiliary processing module mainly performs auxiliary processing, and it has the functions of abnormal data cleaning, parameter loading, daily backup cleaning and risk library file processing, etc. The auxiliary processing module comprises a daily backup cleaning submodule, a risk file recording processing submodule and an abnormal data cleaning submodule. Wherein, the daily backup settlement submodule is used for performing data cleaning and backup at the end of each day; the risk file recording processing submodule is used for processing risk sharing information files, and performing addition, deletion or modification operations on risk sharing information records in a database table by risk sharing information file records; the abnormal data cleaning submodule is used for cleaning the remaining data before the restart of a clearing process.

The above self-determination settlement refers to a settlement initiated initiatively by the system, wherein the settlement data is based on the information recorded and collected by the system.

Figure 17:
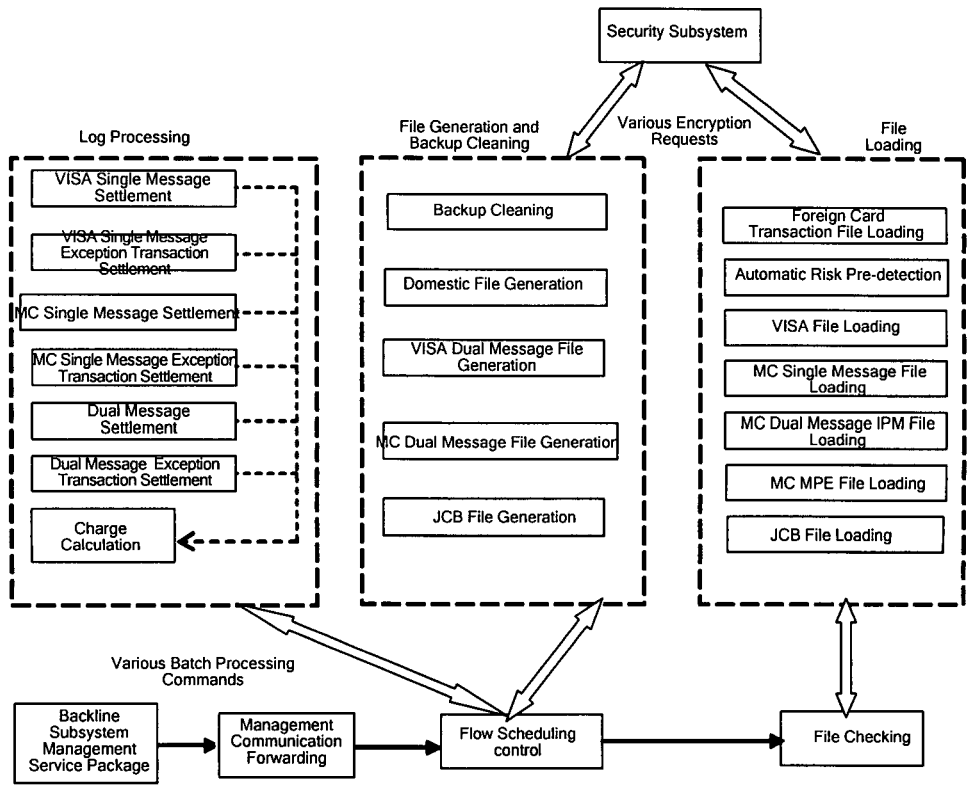
FIG. 17 is a block diagram of a batch processing subsystem of the invention which employs an unself-determination settlement system.

FIG. 17 is a block diagram of a batch processing subsystem employing unself-determination settlement system, which comprises a management communication forwarding module, a flow scheduling control module, a file checking module, a log and charge processing module, a file generation and backup processing module and a file loading module. Wherein, the management communication forwarding module, the flow scheduling control module and the file checking module belongs to a control module.

The flow scheduling control module, which is the core of the whole batch processing subsystem, mainly performs message transferring (via the management communication forwarding module) with the other subsystems, process scheduling and so on. It schedules other modules orderly via flow scheduling control according to a predefined processing flow, so that all the service-required functions of the batch processing subsystem, except file processing (checking and loading), may be realized.

The file checking module continually queries a file information table at a predetermined time interval, and sends file information to a file loading module when it finds that file reception is completed.

The log and charge processing module mainly performs specific processing on logs, which comprises a VISA single message settlement submodule, a VISA single message exception transaction settlement submodule, an MC (MasterCard) single message settlement submodule, an MC single message exception transaction settlement submodule, a dual message settlement submodule and a dual message exception transaction settlement submodule. Wherein, the VISA single message settlement submodule is responsible for settling single message transaction of Visa foreign cards; the VISA single message exception transaction settlement submodule is responsible for settling single message transaction exception transaction of Visa foreign cards; the MC single message settlement submodule is responsible for settling single message transaction of MasterCard foreign cards; the MC single message exception transaction settlement submodule is responsible for settling single message transaction exception transaction of MasterCard foreign cards; the dual message settlement submodule is used for settling dual message of foreign cards; and the dual message exception transaction settlement submodule is used for settling dual message exception transaction of foreign cards.

Specifically, the file generation and backup cleaning module is responsible for generating files and backing up outdated files to a historical database, which comprises a backup cleaning submodule, a domestic file generating submodule, a Visa dual message file generating submodule, an MC dual message file generating submodule and a JCB file generating submodule. Wherein, the backup cleaning submodule is used for backing up outdated files to a historical database; the domestic file generating submodule is used for generating domestic files; the Visa dual message file generating submodule is used for generating Visa dual message files; the MC dual message file generating submodule is used for generating MasterCard dual message files; the JCB file generating submodule is used for generating JCB dual message files and merchant files.

The file loading submodule is responsible for loading various files, which comprises a foreign card transaction file loading submodule, an automatic risk pre-detection submodule, a Visa file loading submodule, an MC single message file loading submodule, an MC dual message IPM (Integrated Product Message) file loading submodule, an MC MPE (Member Profile Extract) file loading submodule and a JCB (Japanese Credit Bureau) file loading submodule. Wherein, the foreign card transaction file loading submodule is used for loading domestic foreign-related transaction dual message files; the automatic risk pre-detection submodule is used for automatic detection of risks; the Visa file loading submodule is used for loading Visa single message and dual message files; the MC single message file loading submodule is used for loading MC single message files; the MC IPM dual message file loading submodule is used for loading MC IPM dual message files; the MC MPE file loading submodule is used for loading MC MPE files; and the JCB file loading submodule is used for loading JCB files.

The above unself-determination settlement refers to the settlement initiated to the system by a foreign card organization at an appointed time according to a protocol when the system is networked with the foreign card organization, wherein the settlement data is based on data recorded and collected by the foreign card organization.

Figure 18:
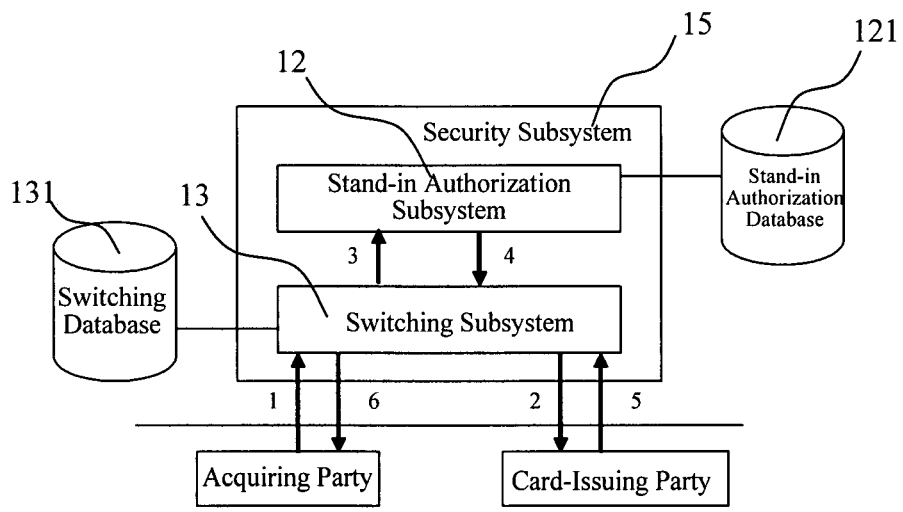
FIG. 18 is a schematic diagram showing a transaction flow of a finance-type transaction initiated in online mode by a member institution using the system of the invention.

FIG. 18 shows a method for a finance-type transaction initiated in online mode by a member institution using the system according to the invention, a transaction flow of which comprises the following steps:

1) an acquiring party initiates a transaction request in online mode to the switching subsystem 13 of the processing center, and the switching subsystem 13 determines whether stand-in authorization is allowed for the transaction, if not, then the transaction flow proceeds to 2); otherwise, the transaction flow proceeds to 3);

2) the switching subsystem 13 of the processing center forwards the transaction request to a card-issuing party, and if the processing center can process a transaction normally with the card-issuing party, the switching subsystem 13 sends the transaction request to the card-issuing party, and then the transaction flow proceeds to 5); otherwise, the switching subsystem 13 determines whether stand-in authorization is allowed for the transaction, if yes, then the transaction flow proceeds to 3), otherwise, the transaction response will be "transaction failed" message, and the transaction flow proceeds to 6);

3) the switching subsystem 13 of the processing center forwards the transaction to the stand-in authorization subsystem 11 for processing, and the transaction flow proceeds to 4);

4) the stand-in authorization subsystem 11 performs stand-in authorization, and returns a response to the switching subsystem 13, then the transaction flow proceeds to 6);

5) the card-issuing party returns a transaction response to the switching subsystem 13 of the processing center after it completes processing the transaction request; and 6) the switching subsystem 13 of the processing center forwards the transaction response to the acquiring party.

Figure 19:
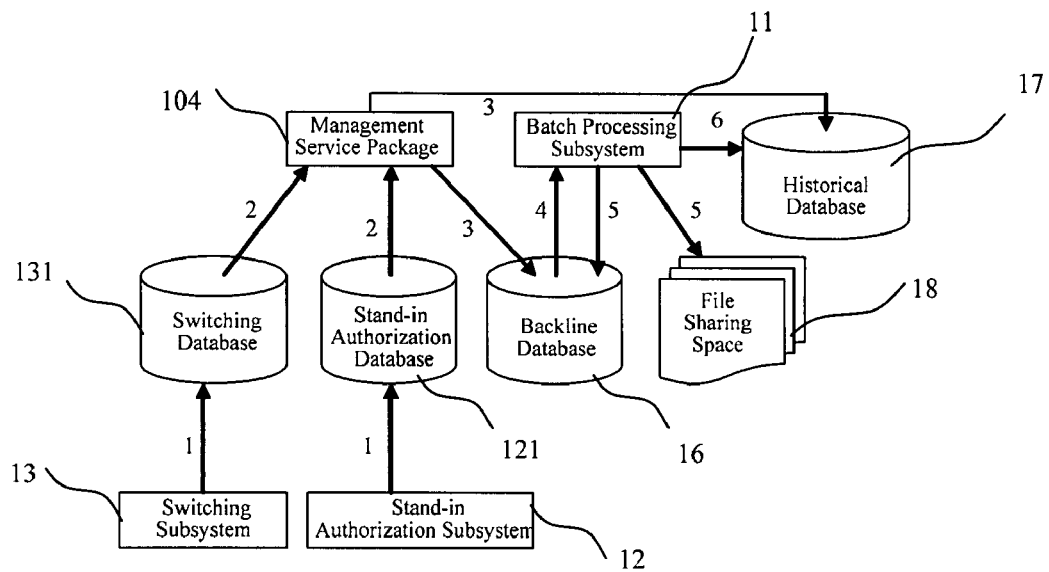
FIG. 19 is a schematic diagram showing a data flow of a finance-type transaction initiated in online mode by a member institution using the system of the invention.

Correspondingly, as shown in FIG. 19, the data flow corresponding to the above method is as follows:

1) the switching subsystem 13 records a switching transaction log, if the transaction passes stand-in authorization, then the stand-in authorization subsystem 11 records a transaction log;

2) the management service package 104 starts a data transfer program at a fixed timing and reads the switching log and the stand-in authorization log;

3) the data transfer program transfers the logs to the historical database 16 and the backline database 17, then records an intermediate statistical summary table;

4) the batch processing subsystem 11 reads the transaction logs from the backline database 17 and performs multi-cycle clearing;

5) the batch processing subsystem 11 records a settlement result in the backline database 17, and forms a clearing file and writes it into the file-sharing space 18; and 6) the batch processing subsystem 11 backs up the settlement result from the backline database 17 to the historical database 16.

Figure 20:
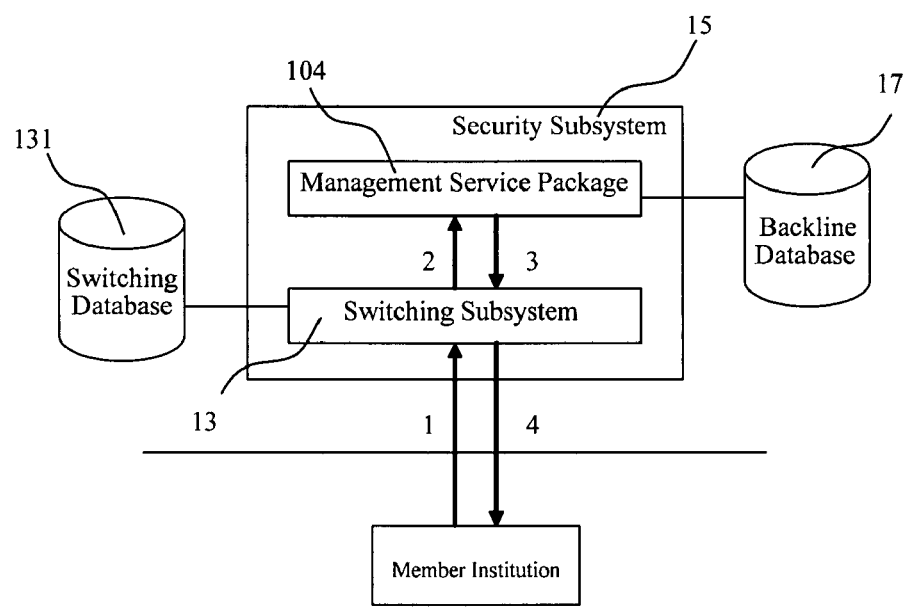
FIG. 20 is a schematic diagram showing a transaction flow of a management-type transaction initiated in online mode by a member institution using the system of the invention.

FIG. 20 shows a method for a management-type transaction initiated in online mode by a member institution using the system according to the invention, a transaction flow of which comprises the following steps:

1) a member institution initiates a transaction request in online mode to the switching subsystem 13 of the processing center;

2) the switching subsystem of the processing center forwards the transaction request to the backline subsystem management service package 104;

3) the management service package 104 returns a transaction response to the switching subsystem 13; and 4) the switching subsystem 13 of the processing center returns the transaction response to the member institution.

Correspondingly, the data flow corresponding to the above method is as follows:

1) the switching subsystem 13 records an internal log; and 2) the management service package 104 records an internal log.

Figure 21:
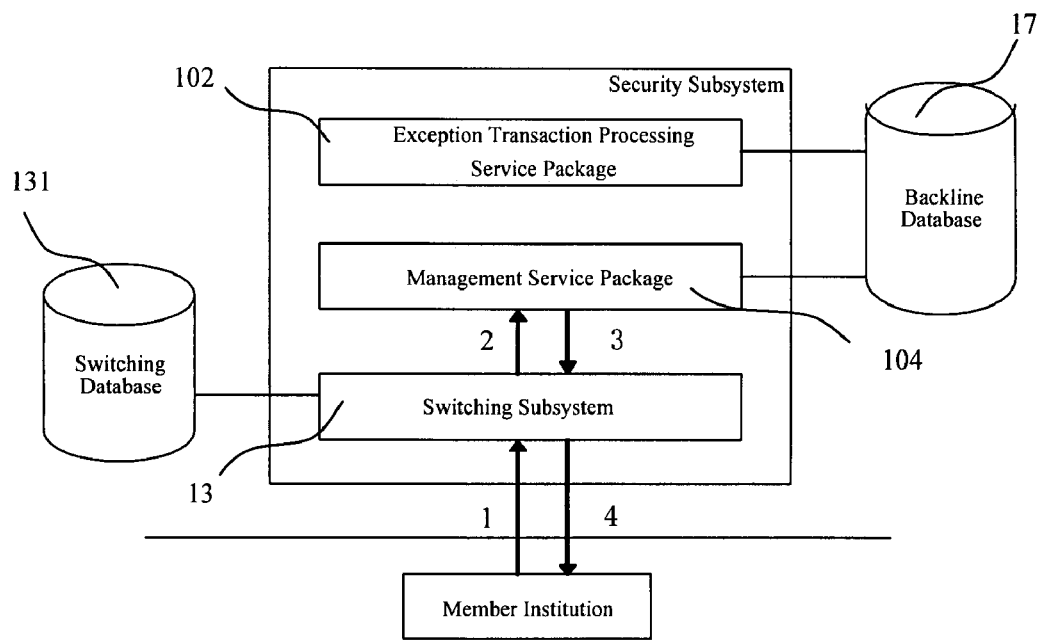
FIG. 21 is a schematic diagram showing a transaction flow of an exception transaction processing transaction initiated in online mode by a member institution using the system of the invention.

FIG. 21 shows a method for an exception transaction processing transaction initiated in online mode by a member institution using the system according to the invention, a transaction flow of which comprises the following steps:

1) a member institution initiates a transaction request in online mode to the switching subsystem 13 of the processing center;

2) the switching subsystem 13 of the processing center forwards the transaction request to the management service package 104 after receiving the transaction request;

3) the management service package 104 returns a transaction response to the switching subsystem 13 after receiving the transaction request; and 4) the switching subsystem 13 of the processing center returns the transaction response to the member institution.

Figure 22:
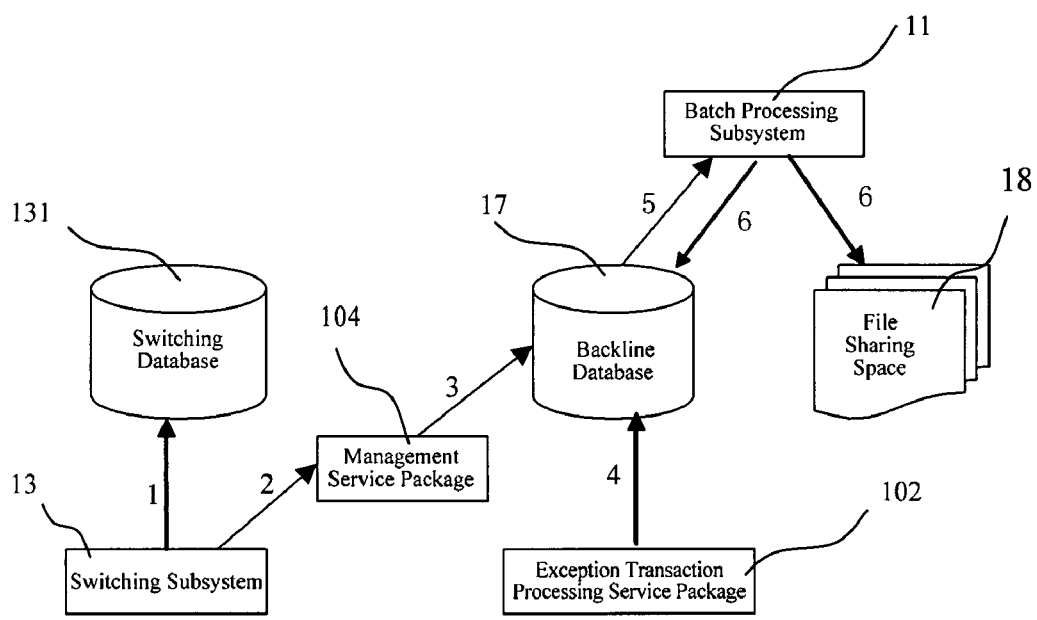
FIG. 22 is a schematic diagram showing a data flow of an exception transaction processing transaction initiated in online mode by a member institution using the system of the invention.

Correspondingly, a schematic diagram of the data flow corresponding to the above method is as shown in FIG. 22, which comprises the following steps:

1) the switching subsystem 13 records a transaction log;

2) the switching subsystem 13 sends a transaction request to the management service package 104;

3) the management service package 104 writes the received information into the backline database 17;

4) the exception transaction processing service package 102 reads the transaction request information from the backline database 17 for processing, and records a log in the backline database 17;

5) the batch processing subsystem 11 reads the transaction log and performs multi-cycle clearing;

6) if the receiving institution is in single message mode, the batch processing subsystem 11 records a settlement result in the backline database 17, and then the exception transaction processing service package 102 sends the settlement result via messages in batches to a member institution; if the receiving institution is in dual message mode, the batch processing subsystem 11 forms a clearing file and writes it into the file-sharing space 18, and then the file transferring subsystem 14 sends it to the member institution.

Figure 23:
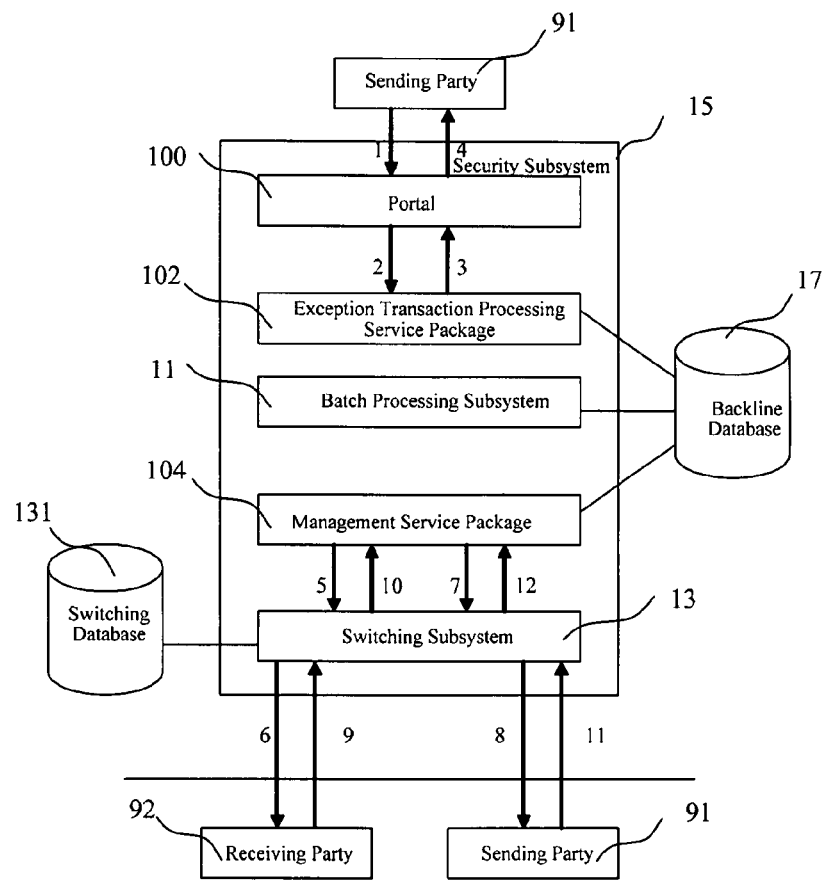
FIG. 23 is a schematic diagram showing a transaction flow of an exception transaction processing transaction initiated by a network platform using the system according to the invention.

FIG. 23 shows a method for an exception transaction processing transaction initiated by a network platform using the system according to the invention, a transaction flow of which comprises the following steps:

1) an operator of a member institution logs in a backline portal and initiates an exception transaction processing transaction;

2) the portal forwards a transaction request to the exception transaction processing service package 102;

3) the exception transaction processing service package 102 records the transaction request in the backline database 17 after processing the transaction request according to service rules, then returns a response to the portal;

4) the portal returns the response to the operator of the member institution;

5) the batch processing subsystem 11 processes the transaction request recorded in the backline database 17, and writes a processing result to the backline database 17;

6) the management service package 104 reads the processing result of the above transaction request by the batch processing subsystem 11 from the backline database 17, and sends it to the switching subsystem 13;

7) the switching subsystem 13 forwards the exception transaction processing result to the receiving institution;

8) the same as 6);

9) the switching subsystem 13 forwards the exception transaction processing result to the sending institution;

10) the receiving institution returns a response to the switching subsystem 13;

11) the switching subsystem 13 forwards the response to the management service package 104;

12) the sending institution returns a response to the switching subsystem 13;

13) the same as 11).

In the above processes, both the sending institution and the receiving institution require the system to return the exception transaction processing result to the corresponding institution in advance. If the receiving institution does not have the above requirement, then Steps 6, 7, 10 and 11 are not required; and if the sending institution does not have the above requirement, then Steps 8, 9, 12 and 13 are not required.

Figure 24:
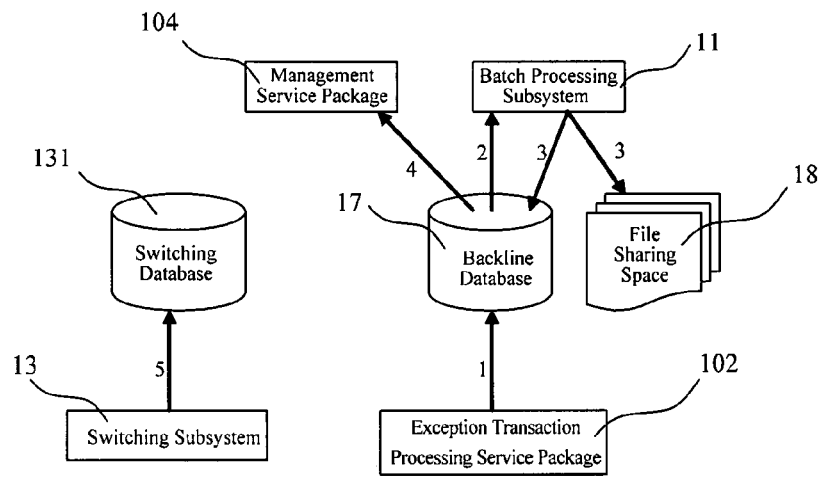
FIG. 24 is a schematic diagram showing a data flow of an exception transaction processing transaction initiated by a network platform using the system according to the invention.

Correspondingly, FIG. 24 shows a schematic diagram of the data flow corresponding to the above method, which comprises the following steps:

1) the exception transaction processing service package 102 records a transaction log;

2) the batch processing subsystem 11 reads the transaction log for multi-batch clearing;

3) the batch processing subsystem 11 records a settlement result in the backline database 17, and forms a clearing file and writes it into the file-sharing space 18;

4) the management service package 104 reads the settlement result, and forms a transaction message and sends it to the switching subsystem 13; and 5) the switching subsystem 13 records an internal log.

Figure 25:
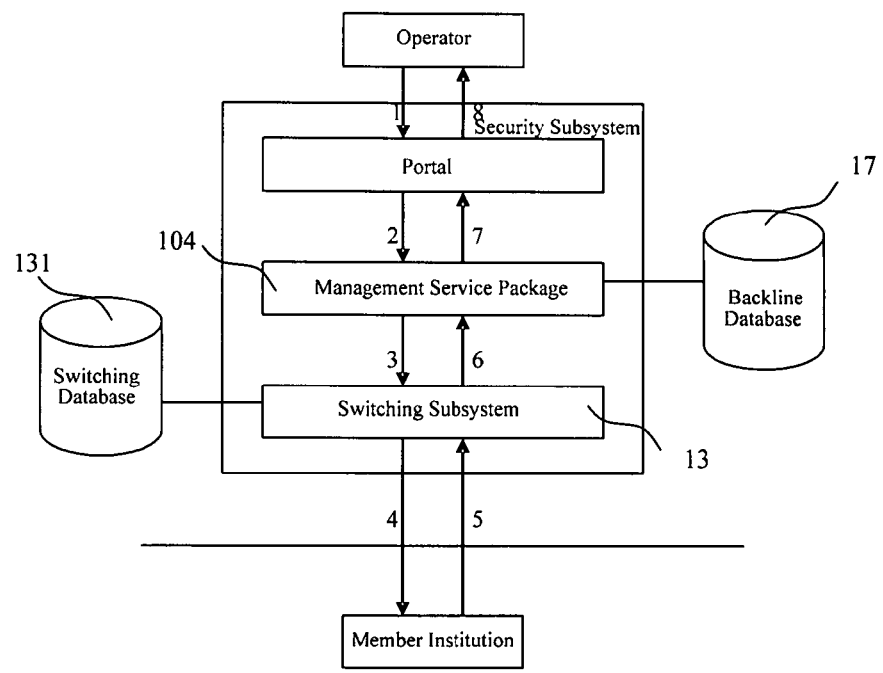
FIG. 25 is a schematic diagram showing a transaction flow of a management-type transaction initiated by a network platform using the system according to the invention.

FIG. 25 shows a method for a management-type transaction initiated via a network platform by a member institution using the system according to the invention, a transaction flow of which comprises the following steps:

1) an operator of the processing center logs in a service portal and initiates a management-type transaction;

2) the portal forwards a transaction request to the management service package 104;

3) the management service package 104 forwards the transaction to the switching subsystem 13;

4) the switching subsystem 13 forwards the transaction to a member institution;

5) the member institution returns a transaction response to the switching subsystem 13;

6) the switching subsystem 13 forwards the transaction response to the management service package 104;

7) the management service package 104 forwards the transaction response to the service portal;

8) the portal returns the transaction response to the operator.

Correspondingly, the data flow corresponding to the above method is as follows:

1) the management service package 104 records an internal transaction log;

2) the switching subsystem 13 records an internal transaction log.

Figure 26:
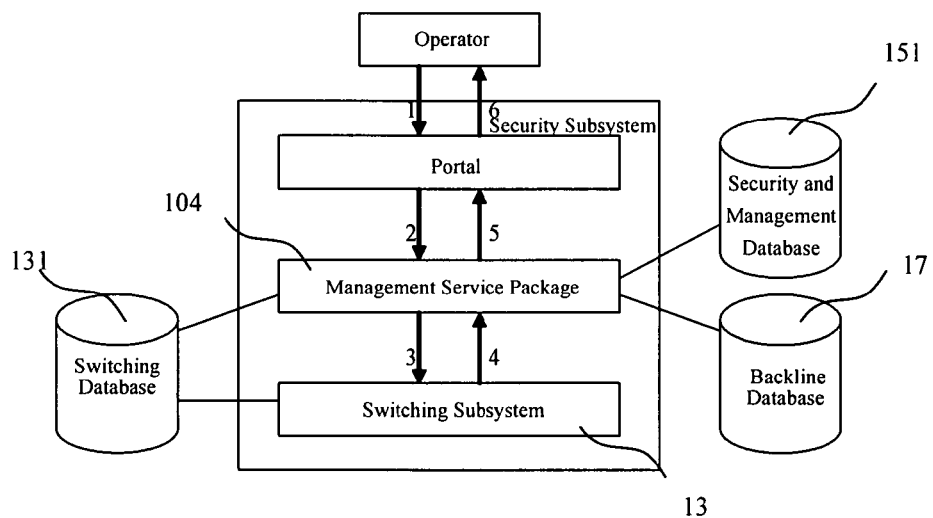
FIG. 26 is a schematic diagram showing a transaction flow of a management operation initiated by a network platform using the system according to the invention.

FIG. 26 shows a method for a management operation initiated via a network platform by a member institution using the novel system according to the invention, a transaction flow of which comprises the following steps:

1) an operator of the processing center logs in a service portal and initiates a management operation transaction;

2) the portal forwards an operation request to the management service package 104;

3) the management service package 104 modifies configuration parameters of the security and management database 151, and "maps" it to the switching database 131 via Relational Connect mechanism of database, then sends a data synchronization instruction to the switching subsystem 13;

4) the switching subsystem 13 reads the modified configuration parameters in the switching database 131 and refreshes its memory, then returns a response to the management service package 104;

5) the management service package 104 forwards the response to the portal;

6) the portal returns the response to the operator.

Figure 27:
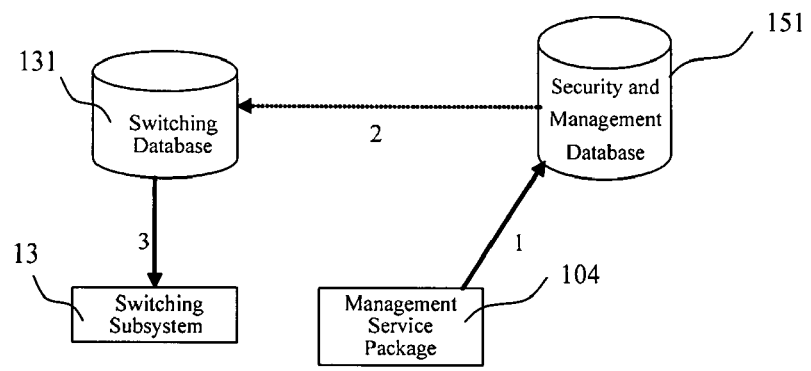
FIG. 27 is a schematic diagram showing a data flow of a management operation initiated by a network platform using the system according to the invention.
Figure 28:
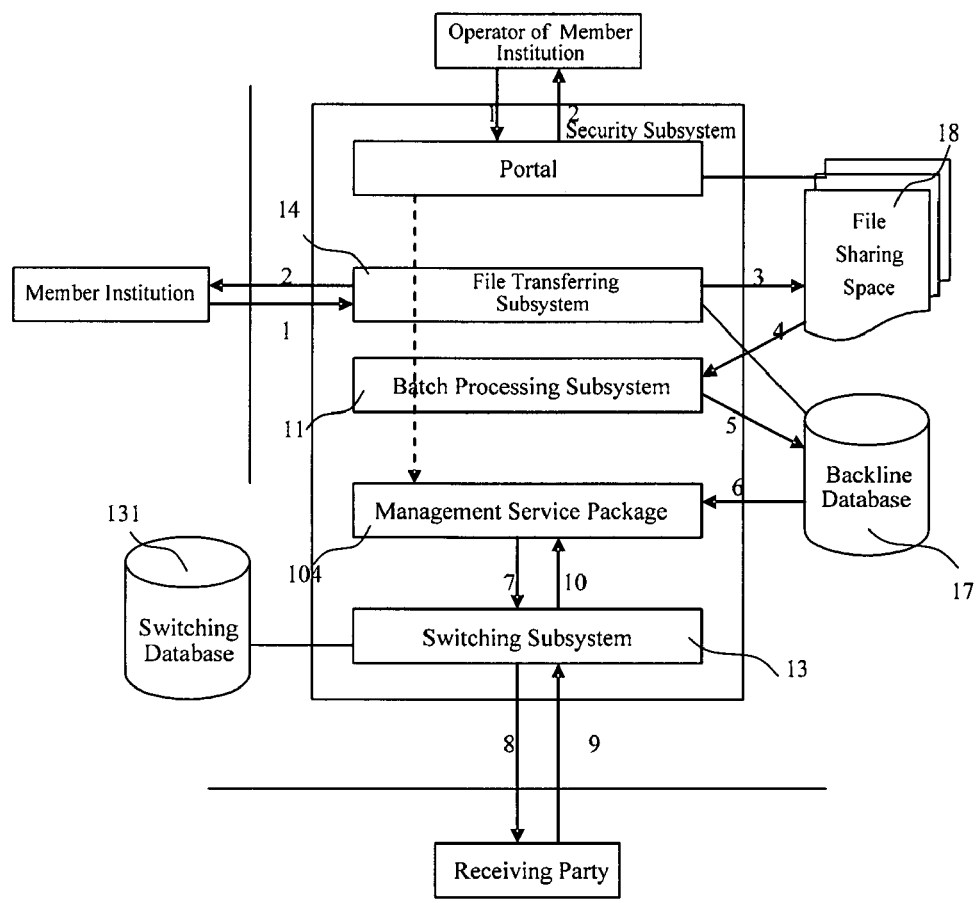
FIG. 28 is a schematic diagram showing a delivering and processing flow of batch files of the system according to the invention.

Correspondingly, FIG. 27 shows a schematic diagram of the data flow corresponding to the above method, which comprises the following steps:

1) the management service package 104 modifies configuration parameters in the security and management database 151;

2) the database "maps" the data to the switching database using Relational Connect mechanism thereof;

3) the switching subsystem 13 reads the configuration parameters and refreshes its memory;

FIG. 28 shows a method for processing batch files using the novel system according to invention, comprising the following steps:

1) an operator of a member institution logs in a portal and initiates a batch file upload transaction, or a member institution uploads batch files via the file transferring subsystem 14;

2) the processing center records file transferring information via the file transferring subsystem 14 or the management service package 104 (called by the portal) and then returns a response to the uploading party, after receiving the files;

3) the file transferring subsystem 14 writes the received files in the file-sharing space 18;

4) the batch processing subsystem 11 reads data from the file-sharing space 18 for processing;

5) the batch processing subsystem 11 writes a processing result to the backline database 17;

6) the management service package 104 reads processing result information from the backline database 17;

7) the management service package 104 informs the switching subsystem 13 of sending the processing result to a receiving party;

8) the switching subsystem 13 sends the processing result to the receiving party;

9) the receiving party returns a response to the switching subsystem 13;

10) the switching subsystem 13 forwards the response to the management service package 104.

Figure 29:
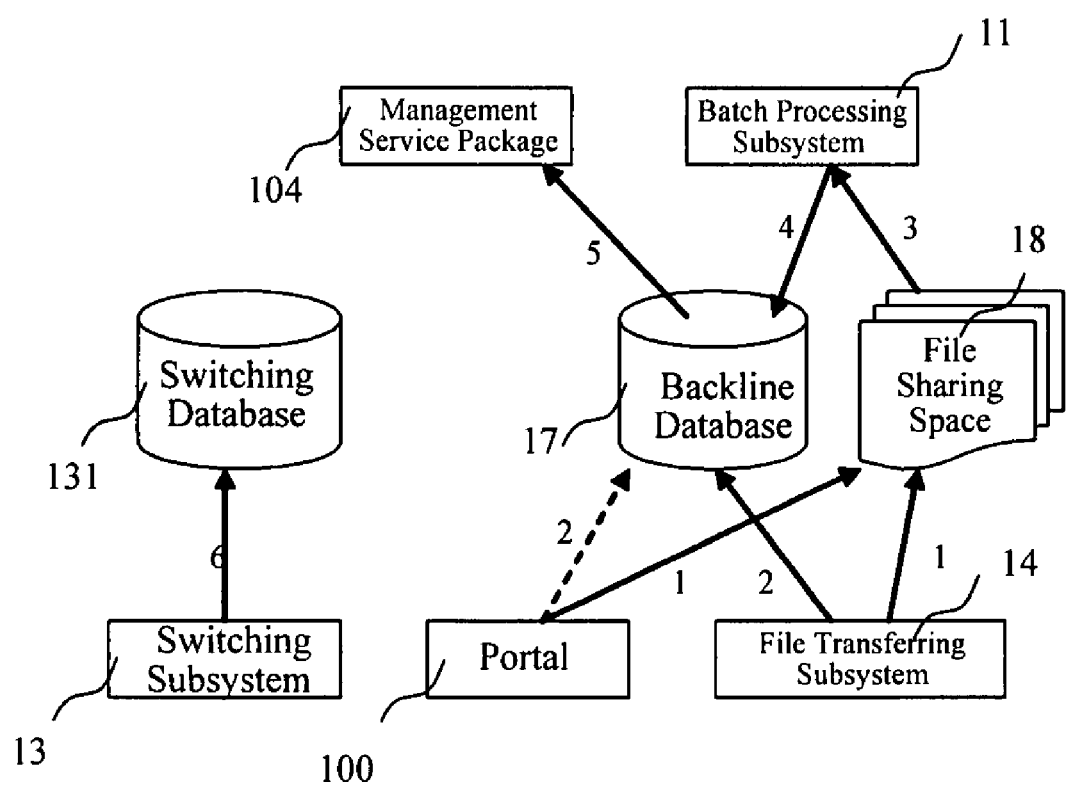
FIG. 29 is a schematic diagram showing a data flow of the delivering and processing flow of batch files of the system according to the invention.

Correspondingly, FIG. 29 shows a schematic diagram of the data flow corresponding to the above method, which comprises the following steps:

1) an operator of a member institution logs in a portal, or a member institution uploads batch files to the file-sharing space 18 via the file transferring subsystem 14;

2) the processing center records file transferring information in the backline database 17 after receiving the files;

3) the batch processing subsystem 11 reads file information from the file-sharing space 18 at determined timing;

4) the batch processing subsystem 11 records the file information in the backline database 17 after processing the file information;

5) the management service package 104 reads the file processing result, and forms a transaction message and sends it to the switching subsystems 13;

6) the switching subsystem 13 records an internal log.

Figure 30:
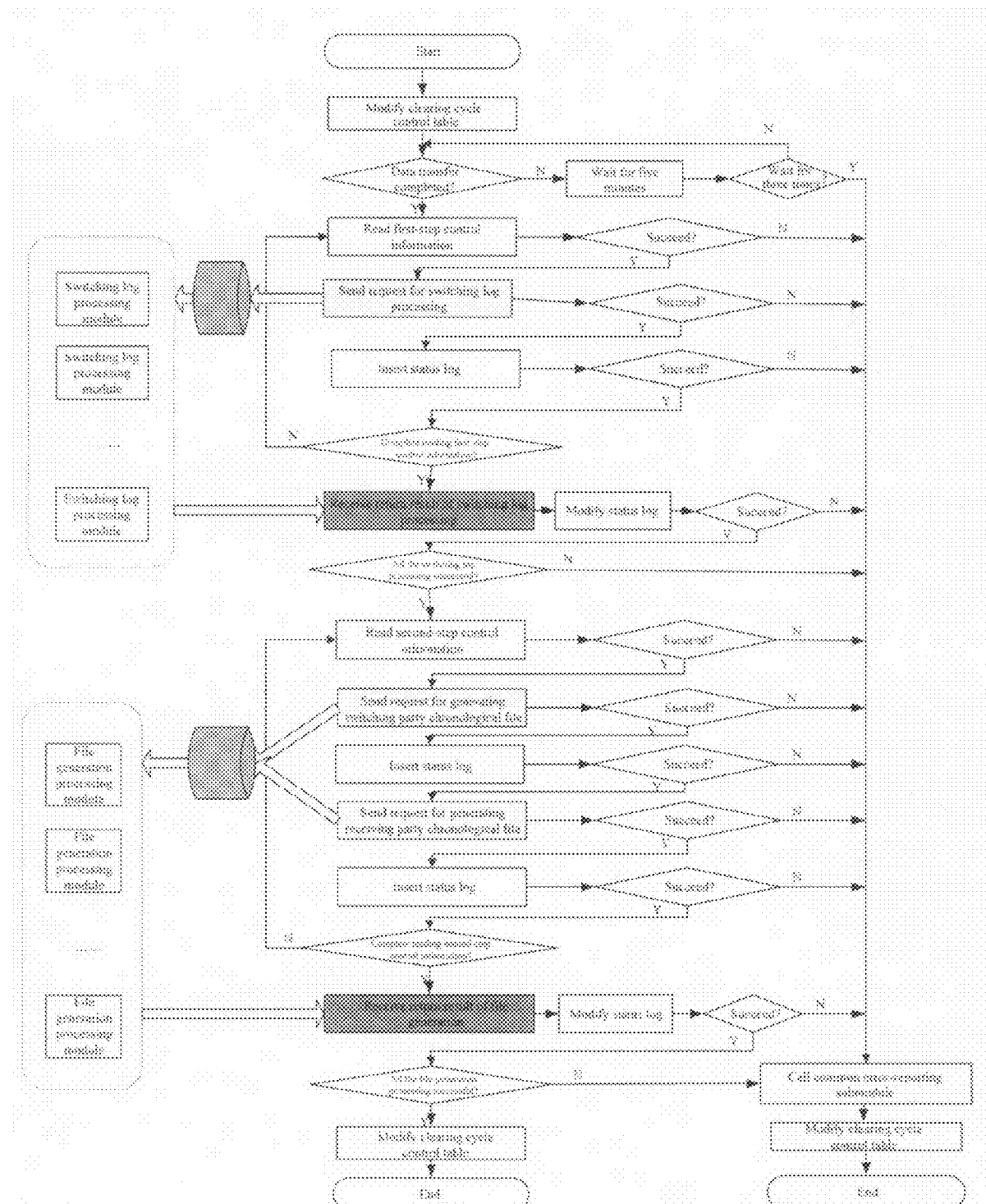
FIG. 30 is a schematic diagram in which a flow scheduling module controls a processing flow when the batch processing subsystem of the invention performs self-determination settlement.

FIG. 30 shows a schematic diagram in which the flow scheduling module controls a processing flow when the batch processing subsystem of the invention performs self-determination clearing, and the detailed description thereof is as follows:

Modify "cycle batch processing status" in a clearing cycle table to "being processed";

Determine whether the transferring of switching logs of the present cycle in a "clearing cycle control table" has been completed, if the switching log transferring completion flag is 0, then wait for five minutes, and perform re-determination, if the transferring of the switching logs has not yet been completed after three times, then call a common error-reporting submodule, and exit the present processing.

The first-step control information comprises a plurality of substeps, and its function is to schedule switching log processing modules, wherein the substeps are in asynchronous sending mode. The substeps are divided according to institution code, and each substep corresponds to switching logs of a switching institution. The parameters sent to the switching log processing module include institution code, settlement date, cycle number, and log flag (for marking the currently used switching log database as 1 or 2).

For a processing record status log of each substep, the status is marked as "being processed".

The subsequent processing can only be performed after the sending of the substeps in the first step is completed.

The switching log processing module calculates service charge, profit allocation and charge on the switching logs one by one, and generates a settlement detail list and a settlement result list. For detailed description thereof, reference may be made to the process flow of "switching log processing module".

The return results of all the substeps in the first step are received, and the status log of the corresponding substep is modified as SUCCESSFUL or FAILED according to the returned processing result. A substep without a return result in the case of timeout is marked as FAILED. For all of the substeps, if any one is failed, then call a common error-reporting submodule and exit the present processing.

The second-step control information comprises a plurality of substeps, and its function is to generate switching party chronological files and receiving party chronological files, wherein the sending mode of the substeps is asynchronous mode. The substeps are divided according to institution code, and the processing data source is clearing detail list. The sent critical parameters are institution code, settlement date, cycle number and type flag (switching or receiving).

A status log is recorded respectively for "sending a request for generating transferring party chronological files" and "sending a request for generating receiving party chronological files", and the status is marked as "being processed".

The subsequent processing can only be performed after the sending of all the substeps in the second step is completed.

When the batch processing is completed successfully, the "cycle batch processing status" in the clearing cycle table will be modified as SUCCESSFUL; otherwise, it will be modified as FAILED.

The return results of all the substeps in the second step are received, and the status log of the corresponding substep is modified as SUCCESSFUL or FAILED according to the returned processing result. A substep without a return result in the case of timeout is marked as FAILED. For all of the substeps, if any one is failed, then call a common error-reporting submodule and exit the present processing.

The invention claimed is:

1. A bankcard transaction exchange system, comprising a processing center, at least one backup center, and a plurality of member institutions connected to the processing center via a network, wherein the processing center comprises at least a switching subsystem and a switching database, a batch processing subsystem, a historical database and a backline database, the switching subsystem is responsible for connecting each of the member institutions, receiving and forwarding a transaction request from the member institutions and a response to the member institutions, providing routing service and writing/reading a switching log into/from the switching database, the switching database is written into the backline database, the batch processing subsystem is responsible for reading the switching log from the backline database, clearing and settling a transaction in a way agreed on with the member institutions according to the switching log, and writing a result of the clearance and settlement to the backline database, wherein the processing center is further configured with a stand-in authorization subsystem, which is responsible for accomplishing stand-in authorization of a transaction according to the agreement with each bank as a member institution, and it's function specifically include quota control, accumulated amount control and accumulated transaction number control, and log recording, charge calculation, calculation, transaction check.

2. The bankcard transaction exchange system according to claim 1, wherein the processing center is further configured with an exception transaction processing service package, which is responsible For processing wrong accounts or suspicious accounts generated during a transaction, and its main functions include original transaction matching, exception transaction file processing, transaction period control and exception transaction settlement tile generation; it is used so that not only the efficiency of the system exchange network will not be affected, but also exception transactions will be settled in time.

3. The bankcard transaction exchange system according to claim 2, wherein the exception transaction processing service package supports three exception transaction request initiating modes: online transaction, file transferring and Web.

4. The bankcard transaction exchange system according to claim 1 wherein each of the subsystems is configured with an error-reporting information processing module, which is responsible for processing all the error information in the subsystem, and by processing all the error information in the subsystem unifiedly via the module, it is favorable to increase the processing speed of the subsystem itself and the throughput of the system.

5. The bankcard transaction exchange system according to claim 1 wherein the stand-in authorization includes normal stand-in authorization and abnormal stand-in authorization.

6. The bankcard transaction exchange system according to claim 1, wherein providing routing service comprises: determining routing information of a message according to a card Bank Identification Number, a transaction code and an institution code contained in the message.

7. A bankcard transaction exchange method in a bankcard transaction exchange system comprising a processing center, the bankcard transaction exchange method comprising:
   receiving and forwarding by a computer processor of a switching subsystem included in a processing center, a transaction request from a plurality of member institutions connected to the processing center and a response to the member institutions, providing routing service and writing a switching log into a switching database connected with the switching subsystem in the processing center;
   writing the switching log from the switching database into a backline database included in the processing center; and
   reading, by a batch processing system included in the processing center, the switching log from the backline database, clearing and settling a transaction in a way agreed on with the member institutions according to the switching log, and writing a result of the clearance and settlement into the backline database of the processing center, wherein the processing center is further configured with a stand-in authorization subsystem, which is responsible for accomplishing stand-in authorization of a transaction according to the agreement with each bank member institution, and its functions specifically include quota control, accumulated amount control and accumulated transaction number control, and log recording, charge calculation, transaction check.

8. The bankcard transaction exchange system according to claim 1, wherein the processing center is further configured with
   a security subsystem, which provides security control measures at various layers of the system and ensures that the system operates safely; its main functions include user right control, user validity verification, key management, algorithm deposit, message encryption and decryption, password check, file encryption and decryption control and log recording, etc.

9. The bankcard transaction exchange system according to claim 1, wherein the processing center is further configured with
   a management service package, which is responsible for the unified management on member institution information and system parameters, and for the online management on the transferring and processing of a transaction; and its main functions include: adding, deleting, modifying, querying and activating of institution information and system parameters; online sign-in and sign-our; key reset; system monitoring.

10. The bankcard transaction exchange system according to claim 9, wherein the management service package makes the system sufficiently adapted to the requirements on service change by setting and modifying parameters, that is, all or some or operating rules of the system may he adjusted or modified without modifying other parts of the system and without shutting down the system.

11. The bankcard transaction exchange system according to claim 9, wherein the processing center is further configured with
a risk information sharing service package, which is responsible for collecting, processing and distributing various risk information, and preventing a forbidden transaction from occurring, lowering transaction risk, and internally sharing a list of payment forbidding, transaction rejection, forbidden cardholders, forbidden card-holding enterprises and forbidden merchants, etc. and the related detail records for the member institutions and the system.

12. The bankcard transaction exchange system according to claim 1, wherein the processing center is further configured with
a file transferring subsystem, which is responsible for the tile transferring between member institutions and is a main interface for file exchange between the system and the member institutions; and its main functions include external file transferring function, information exchange function with internal subsystems, and file cleaning function, so that the smoothness of online transaction communication channel is ensured, and the overall operating efficiency of the system is increased.

13. The bankcard transaction exchange system according to claim 1, wherein the processing center is further configured with
a query and report service package, which is responsible for providing information query to internal and external institutions, and making, analyzing and obtaining a report.

14. The bankcard transaction exchange system according to claim 13, wherein the management service package, the risk information sharing service package, the exception transaction processing service package and the query and report service package may also be centralizedly configured as a backline subsystem, and at the same time, the backline subsystem is further configured with a dedicated backline portal, which provides a unified and easy-to-use operating interface with the uniform style to various operators of the system, so that the system is more convenient to operate.

15. The bankcard transaction exchange method according to claim 7, wherein providing routing service comprises: determining routing information of a message according to a card Bank identification Number, a transaction code and an institution code contained in the message.

16. The bankcard transaction exchange method according to claim 7, further comprising a process for a finance-type transaction initiated in online mode by a member institution, a transaction flow of which comprises the following steps of:
1) initiating by an acquiring party a transaction request in online mode to the switching subsystem of the processing center, determining by the switching subsystem whether the transaction is allowed for stand-in authorization, and if not, proceeding to step 2); otherwise, the transaction flow proceeding to step 3);

2) forwarding by the switching subsystem of the processing center the transaction request to a card-issuing party, and if the processing center can process a transaction normally with the card-issuing party, sending the transaction request to the card-issuing party, and proceeding to step 5); otherwise, determining by the switching subsystem whether the transaction is allowed for stand-in authorization, and if yes, proceeding to step 3), otherwise, forming a transaction response which is a "transaction failed" message, and proceeding to step 6);

3) forwarding by the switching subsystem of the processing center the transaction to a stand-in authorization subsystem for processing, and proceeding to step 4);

4) performing by the stand-in authorization subsystem stand-in authorization and returning a response to the switching subsystem, then proceeding to step 6);

5) returning by the card-issuing party a transaction response to the switching subsystem of the processing center after it completes processing the transaction request; and 6) forwarding by the switching subsystem of the processing center the transaction response to the acquiring party.

17. The bankcard transaction exchange method according to claim 7, further comprising a process for a management-type transaction initiated in online mode by a member institution, a transaction flow of which comprises the following steps of:
1) initiating by the member institution a transaction request in online mode to the switching subsystem of the processing center;
2) forwarding by the switching subsystem or the processing center the transaction request to a backline subsystem management service package;
3) returning by the management service package a transaction response to the switching subsystem; and
4) returning by the switching subsystem of the processing center the transaction response to the member institution.

18. The bankcard transaction exchange method according to claim 7, further comprising a process for an exception transaction processing transaction initiated in online mode by a member institution, a transaction flow of which comprises the following steps of:
1) initiating by the member institution a transaction request in online mode to the switching subsystem of the processing center;
2) forwarding by the switching subsystem of the processing center the transaction request to a management service package after receiving the transaction request;
3) returning by the management service package a transaction response to the switching subsystem after receiving the transaction request; and
4) returning by the switching subsystem of the processing center the transaction response to the member institution.

19. The bankcard transaction exchange method according to claim 7, further comprising a process for an exception transaction processing transaction initiated by a network platform, a transaction flow of which comprises the following steps of:
1) logging by an operator of a member institution, in a backline portal and initiating an exception transaction processing transaction;
2) forwarding by the portal a transaction request to an exception transaction processing service package;

3) processing by the exception transaction processing service package the transaction request according to service rules and recording the transaction request in a backline database, then returning a response to the portal;
4) returning by the portal the response to the operator of the member institution;
5) processing by a batch processing subsystem the transaction request recorded in the backline database, and writing a processing result to the backline database;
6) reading by a management service package the processing result of the transaction request by the batch processing subsystem from the backline database, and sending the processing result to the switching subsystem;
7) forwarding by the switching subsystem the exception transaction processing result to a receiving institution;
8) reading, by a management service package, the processing result of the transaction request by the hatch processing subsystem from the backline database, and sending the processing result to the switching subsystem;
9) forwarding by the switching subsystem the exception transaction processing result to a sending institution;
10) returning by the receiving institution a response to the switching subsystem;
11) forwarding by the switching subsystem the response to the management service package;
12) returning by the sending institution a response to the switching subsystem; and
13) forwarding by the switching subsystem the response to the management service package.

20. The bankcard transaction exchange method according to claim 7, further comprising a process for an exception transaction processing transaction initiated by a network platform, a transaction flow of which comprises the following steps of:
1) logging by an operator of a member institution, in a backline portal and initiating an exception transaction processing transaction;
2) forwarding by the portal a transaction request to an exception transaction processing service package;
3) processing by the exception transaction processing service package the transaction request according to service rules and recording the transaction request in a backline database, then returning a response to the portal;
4) returning by the portal the response to the operator of the member institution;
5) processing by a batch processing subsystem the transaction request recorded in the backline database, and writing a processing result to the backline database;
6) reading by a management service package the processing result of the transaction request by the batch processing subsystem from the backline database, and sending the processing result to the switching subsystem;
7) forwarding by the switching subsystem the exception transaction processing result to a sending institution;
8) returning by the sending institution a response to the switching subsystem; and
9) forwarding by the switching subsystem the response to the management service package.

21. The bankcard transaction exchange method according to claim 7, further comprising a process for an exception transaction processing transaction initiated by a network platform, a transaction flow of which comprises the following steps of:
1) logging by an operator of a member institutions, in a backline portal and initiating an exception transaction processing transaction;
2) forwarding by the portal a transaction request to an exception transaction processing service package;
3) processing by the exception transaction processing service package the transaction request according to service rules and recording the transaction request in a backline database, then returning a response to the portal;
4) returning by the portal the response to the operator of the member institution;
5) processing by a batch processing subsystem the transaction request recorded in the backline database, and writing a processing result to the backline database;
6) reading by a management service package the processing result of the transaction request by the hatch processing subsystem from the backline database, and sending the processing result to the switching subsystem;
7) forwarding by the switching subsystem the exception transaction processing result IC) U receiving institution;
8) returning by the receiving institution a response to the switching subsystem; and
9) forwarding by the switching subsystem the response to the management service package.

22. The bankcard transaction exchange method according to claim 7, further comprising a process for a management-type transaction initiated by a network platform, a transaction flow of which comprises the following steps of:
1) logging by an operator of the processing center, in a service portal and initiating a management-type transaction;
2) forwarding by the portal a transaction request to a management service package;
3) forwarding by the management service package the transaction to the switching subsystem;
4) forwarding by the switching subsystem the transaction to a member institution;
5) returning by the member institution a transaction response to the switching subsystem;
6) forwarding by the switching subsystem the transaction response to the management service package;
7) forwarding by the management service package the transaction response to the service portal; and
8) returning by the portal the transaction response to the operator.

23. The bankcard transaction exchange method according to claim 7, further comprising a process for a management operation initiated by a network platform, a transaction flow of which comprises the following steps:
1) logging, by an operator of the processing center, in a service portal and initiating a management operation transaction;
2) forwarding by the portal an operation request to a management service package;
3) modifying by the management service package configuration parameters of a security and management database, and mapping the configuration parameters to the switching database via Relational Connect mechanism of database, then sending a data synchronization instruction to the switching subsystem;
4) reading by the switching subsystem the modified configuration parameters from the switching database and refreshing memory, then returning a response to the management service package;

5) forwarding by the management service package the response to the portal; and
6) returning by the portal the response to the operator.

24. The bankcard transaction exchange method according to claim 7, further comprising a process for processing batch files, comprising the following steps of:
1) logging, by an operator of a member institutions, in a portal and initiating a batch file upload transaction, or uploading by the member institution batch files via a file transferring subsystem;
2) recording by the processing center file transferring information via a file transferring subsystem or a management service package (called by the portal) and then returning a response to the uploading party, after it receives the flies;
3) writing by the file transferring subsystem the received files into a file-sharing space;
4) reading by a batch processing subsystem data from the file-sharing space for processing;
5) writing by the batch processing subsystem a processing result into the backline database;
6) reading by the management service package processing result information from the backline database;
7) informing by the management service package the switching subsystem of sending the processing result to a receiving party;
8) sending by the switching subsystem the processing result to the receiving party;
9) returning by the receiving party a response to the switching subsystem; and
10) forwarding by the switching subsystem the response to the management service package.

* * * * *